(12) United States Patent
Kulesa et al.

(10) Patent No.: US 12,081,850 B2
(45) Date of Patent: Sep. 3, 2024

(54) APPARATUS FOR FASTENING AN IMAGING DEVICE AT A PREDETERMINED ARRANGEMENT FOR IMAGE CAPTURE AND DETECTING REGIONS OF INTEREST IN AN IMAGE USING IMAGE PROCESSING

(71) Applicant: FIRST ADVANTAGE CORPORATION, Atlanta, GA (US)

(72) Inventors: Chad Kulesa, Coon Rapids, MN (US); Jerry Balderas, Grapevine, TX (US); Adebayo Bello, Decatur, GA (US); Aravind Telidevara, Charlotte, NC (US); Eric Luby, Carisle, MA (US); Charlie Oyler, Cumming, GA (US); Ranjeev Teelock, Dallas, TX (US); Deepa Vangimalla, Duluth, GA (US)

(73) Assignee: FIRST ADVANTAGE CORPORATION, Atlanta, GA (US)

( * ) Notice: Subject to any disclaimer, the term of this patent is extended or adjusted under 35 U.S.C. 154(b) by 0 days.

(21) Appl. No.: 17/888,455

(22) Filed: Aug. 15, 2022

(65) Prior Publication Data
US 2023/0050987 A1    Feb. 16, 2023

Related U.S. Application Data

(60) Provisional application No. 63/233,034, filed on Aug. 13, 2021.

(51) Int. Cl.
*H04N 23/54* (2023.01)
*H04N 23/56* (2023.01)

(52) U.S. Cl.
CPC ............ *H04N 23/54* (2023.01); *H04N 23/56* (2023.01)

(58) Field of Classification Search
CPC ........ H04N 23/54; H04N 23/56; H04N 23/57; G03B 15/07; G03B 17/561
See application file for complete search history.

(56) References Cited

U.S. PATENT DOCUMENTS

| | | | |
|---|---|---|---|
| 8,656,929 B2 | 2/2014 | Miller et al. | |
| 2014/0226298 A1 | 8/2014 | Palmer et al. | |
| 2017/0184946 A1* | 6/2017 | Hoffmann | ............ F16M 11/041 |
| 2018/0144468 A1 | 5/2018 | Beule et al. | |
| 2021/0223239 A1* | 7/2021 | de Haan | .......... G01N 33/54387 |
| 2021/0266427 A1* | 8/2021 | Kidakarn | ............... H04N 23/57 |

OTHER PUBLICATIONS

International Search Report and Written Opinion issued Nov. 3, 2022 in PCT/US22/40381, 21 pages.

* cited by examiner

*Primary Examiner* — Gevell V Selby
(74) *Attorney, Agent, or Firm* — Oblon, McClelland, Maier & Neustadt, L.L.P.

(57) ABSTRACT

An apparatus includes a base; a mount attached to the base, the mount including a backplate, a bottom platform formed perpendicular to the backplate along a bottom of the backplate, the bottom platform including a retention wall formed as part of the bottom platform distant from the portion of the bottom platform attached to the backplate, the retention wall being perpendicular to the bottom platform, and a first side arm formed as part of the backplate along a side of the backplate and extending outwards from the backplate, and a notch holder formed as part of the base, the notch holder configured to secure a drug test device to the base.

19 Claims, 19 Drawing Sheets

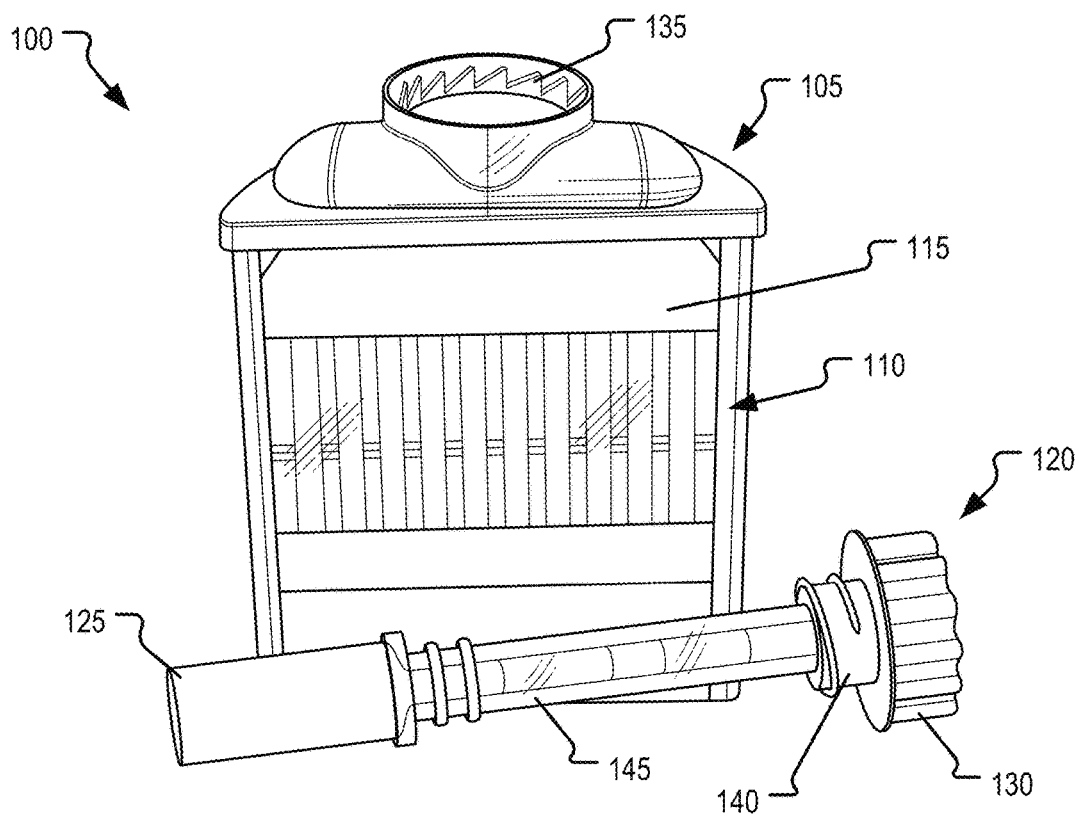
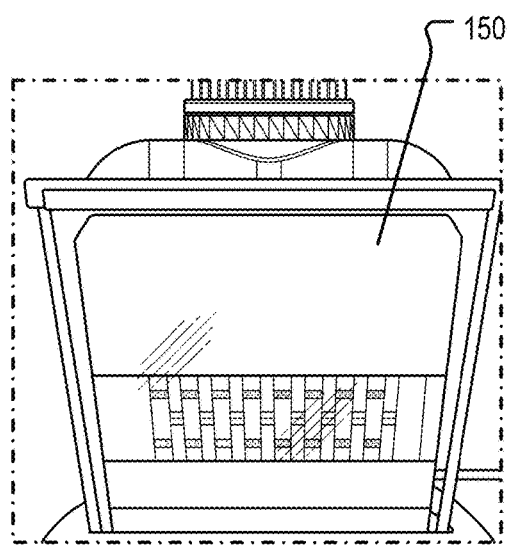 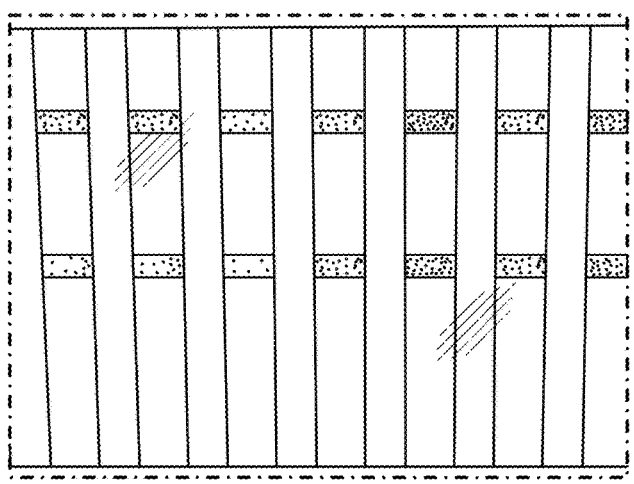
FIG. 1
FIG. 2  FIG. 3

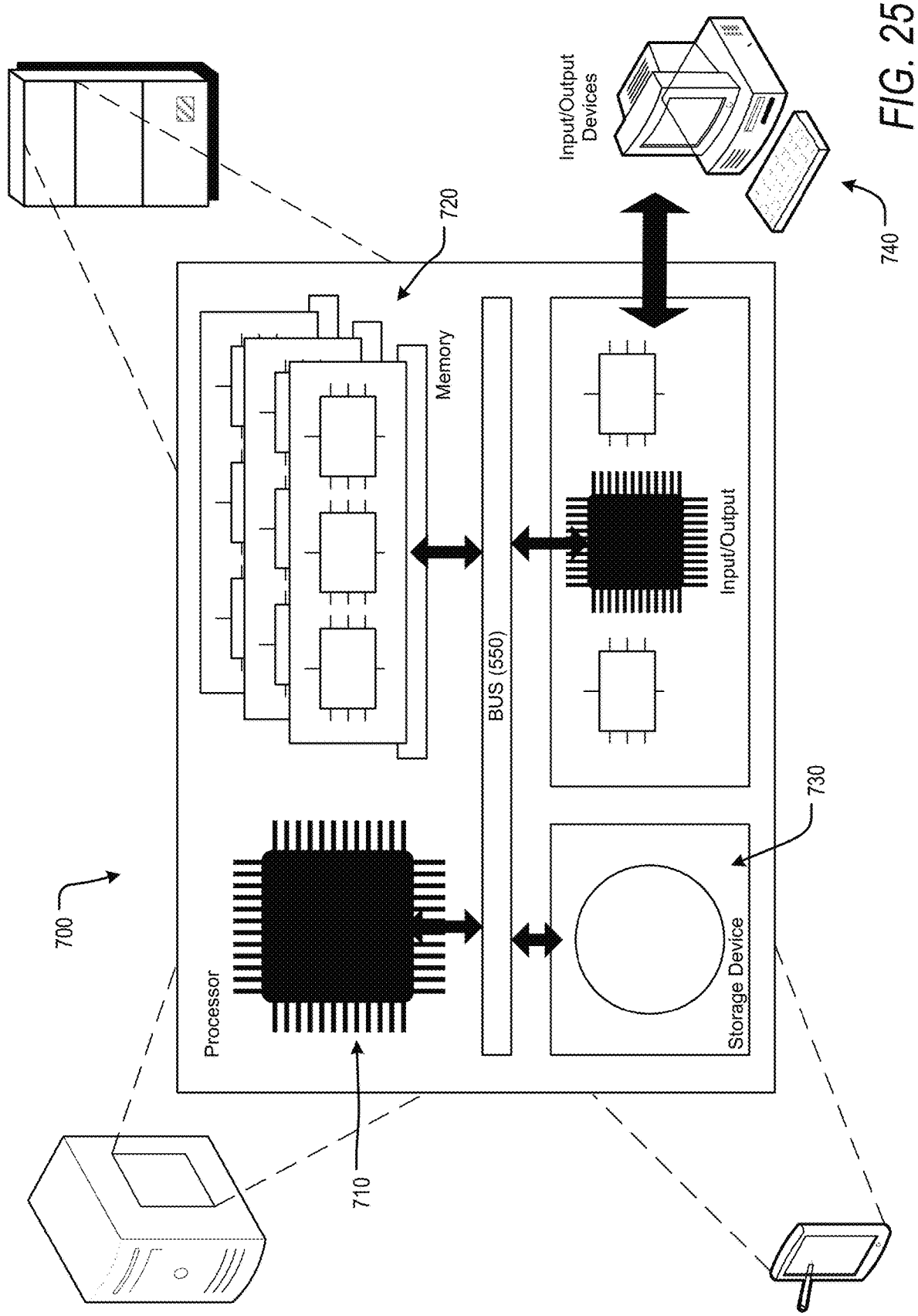

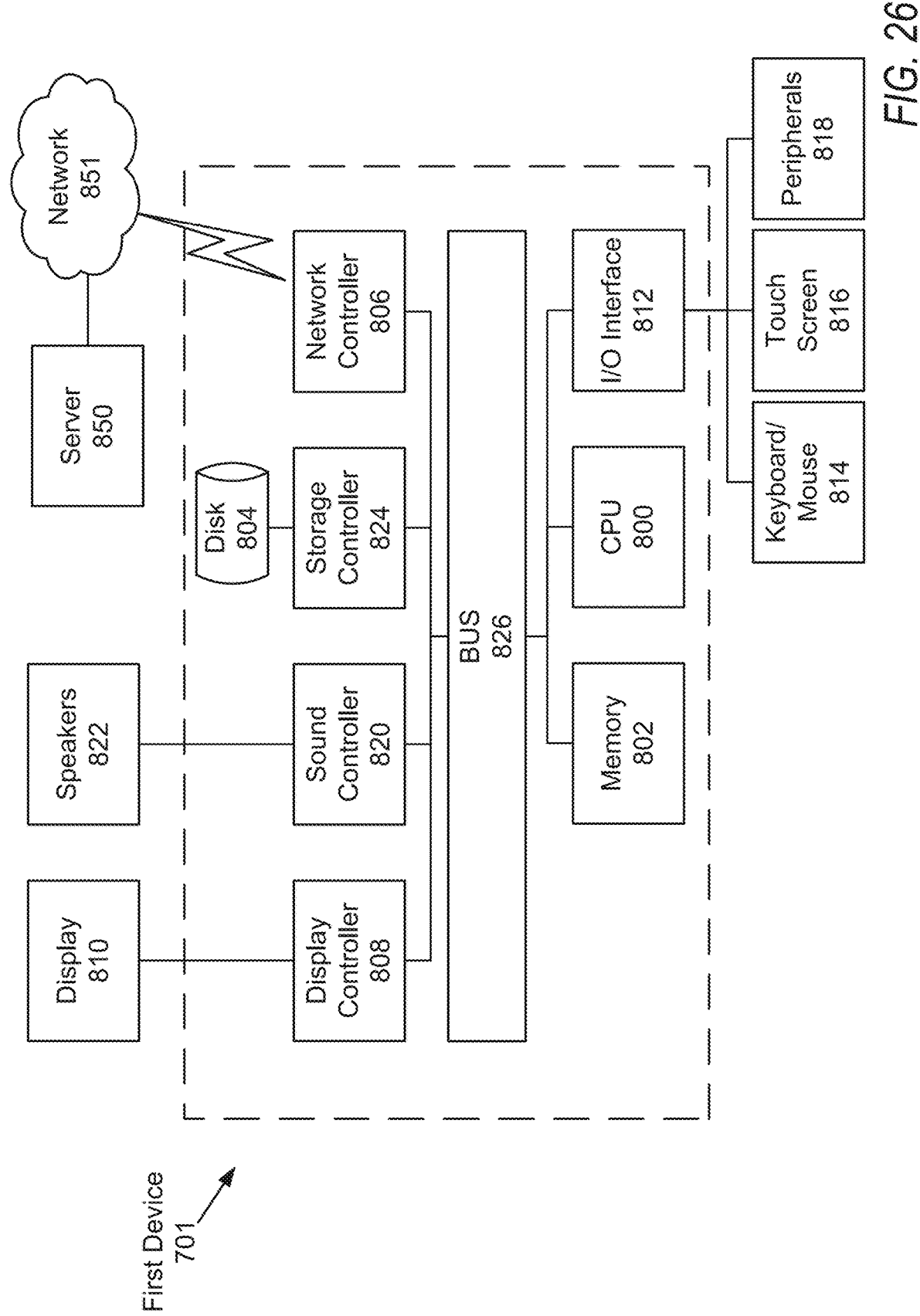

APPARATUS FOR FASTENING AN IMAGING DEVICE AT A PREDETERMINED ARRANGEMENT FOR IMAGE CAPTURE AND DETECTING REGIONS OF INTEREST IN AN IMAGE USING IMAGE PROCESSING

CROSS-REFERENCE TO RELATED APPLICATIONS

The present application claims priority to U.S. Provisional Application No. 63/233,034, filed Aug. 13, 2021, the entire content of which is incorporated by reference herein in its entirety for all purposes.

FIELD OF THE DISCLOSURE

The present disclosure relates to an apparatus for fastening an imaging device and detecting regions of interest in an image.

DESCRIPTION OF THE RELATED ART

Capturing an image or video of an object can be challenging when an image capture device can be oriented freely during image capture. Further, detecting regions of interest in the captured image can have its challenges.

The foregoing description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

According to an embodiment, the present disclosure relates to a device including a base; a mount attached to the base, the mount including a backplate, a bottom platform formed perpendicular to the backplate along a bottom of the backplate, the bottom platform including a retention wall formed as part of the bottom platform distant from the portion of the bottom platform attached to the backplate, the retention wall being perpendicular to the bottom platform, and a first side arm formed as part of the backplate along a side of the backplate and extending outwards from the backplate, and a notch holder formed as part of the base, the notch holder configured to secure a drug test device to the base.

The foregoing paragraphs have been provided by way of general introduction and are not intended to limit the scope of the following claims. The described embodiments, together with further advantages, will be best understood by reference to the following detailed description taken in conjunction with the accompanying drawings.

BRIEF DESCRIPTION OF THE DRAWINGS

FIG. 1 is a schematic of a drug test device that can provide a non-invasive drug screening process, according to an embodiment of the present disclosure.

FIG. 2 is a schematic illustrating the drug test device including results of a drug test displayed on the drug strip, according to an embodiment of the present disclosure.

FIG. 3 is a schematic illustrating a zoomed and cropped region of the drug strip, according to an embodiment of the present disclosure.

FIG. 25 is a schematic of a hardware system for performing a method, according to an exemplary embodiment of the present disclosure.

FIG. 26 is a schematic of a hardware configuration of a device for performing a method, according to an exemplary embodiment of the present disclosure.

DETAILED DESCRIPTION

Figure 4:
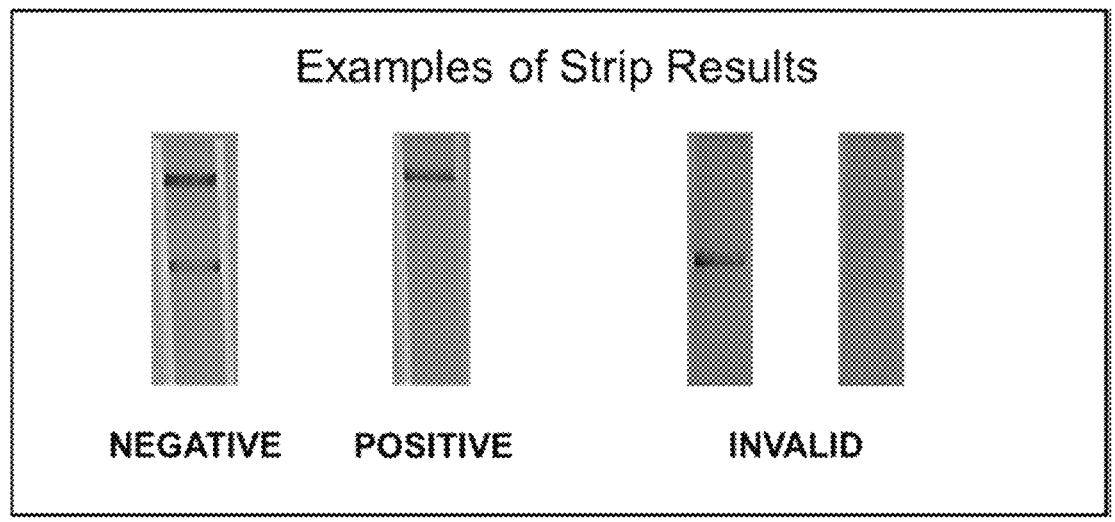
FIG. 4 shows images of results on the drug strip, according to an embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

FIG. 1 is a schematic of a drug test device 100 that can provide a non-invasive drug screening process, according to an embodiment of the present disclosure. In an embodiment, the drug test device 100 includes a bottle 105 for receiving the saliva swab 120. In an embodiment, the drug test device 100 is a container. The drug test device 100 can include drug strips 110 disposed in a chamber 115 of the bottle 105 for testing the presence of a drug or chemical. The drug test device 100 can also include a saliva swab 120. The saliva swab 120 can include an absorbent pad 125, such as a sponge or porous strip, disposed at a first end of the saliva swab 120. The absorbent pad 125 need not be absorbent nor a pad, and instead can be a reservoir configured to collect saliva via scooping, suction, or adhesion. A second end of the saliva swab 120 can include a cap 130 configured to couple with an opening of the bottle 105. For example, the opening of the bottle 105 can include a threaded portion 135 and the cap 130 can include a threaded inner skirt 140 configured to twistably engage the threaded portion 135 of the bottle 105. The cap 130 can be configured to lock after coupling with the bottle 105 such that the cap 130 cannot be removed from the bottle 105 once the cap 130 has locked onto the bottle 105. The first end and the second end of the saliva swab 120 can be connected via a stem, wherein the stem 145 is an elongated staff having sufficient length to dispose the first end with the attached absorbent pad 125 proximal to a bottom of the bottle 105 when the cap 130 is coupled to the bottle 105. The elongated stem 145 can also facilitate easier acquisition of saliva from a mouth, wherein the saliva can be pooled towards the back of the mouth.

The drug test device 100 can include, for example, 10 drug strips 110 in the chamber 115 for drug testing. Each strip of the drug strips 110, after exposed to an applicant's saliva, can return a NEGATIVE, POSITIVE, or INVALID result to indicate the presence (or lack thereof) of a predetermined drug. Notably, a portion of the bottle 105 can be transparent and provide a view of the drug strips 110 included therein. For example, the bottle 105 can be made of a clear polymer and have a flat surface along a wall of the chamber 115. The drug strips 110 can be arranged proximal to the flat surface along the wall of the chamber 115. Each drug test strip can test for a different predetermined drug. For example, a first drug test strip can test for marijuana (i.e., the chemical tetrahydrocannabinol (THC)), a second drug test strip can test for cocaine, a third drug test strip can test for methamphetamine, and a fourth drug test strip can serve as a control. By using a webcam in combination with a software application on a processing device, the results for all the drug test strips can be scanned and viewed. This method (executed by (processing circuitry of) the processing device 2100 of FIG. 21A) will be discussed below with reference to additional figures and description.

Described herein is a method that automatically reads and accurately determines the results displayed on each strip of the drug strips 110. To this end, FIG. 2 is a schematic illustrating the drug test device 100 including results of a drug test displayed on the drug strips 110, according to an embodiment of the present disclosure. FIG. 3 is a schematic illustrating a zoomed and cropped region of the drug strips 110, according to an embodiment of the present disclosure. The method can provide robust results in any lighting environment since the drug test device 100 can be deployed in any location with variable lighting conditions. That is, the method can provide robust results even in an environment where the results of the drug strips 110 are imaged with low light. The method can be browser-based (i.e., performed on a web-browser of the processing device 2100) to cut down on bandwidth costs and to facilitate easier enhancement in the future. The method can also be performed remotely—for example, at a server or a device external to the processing device 2100, or be distributed such that some of the processes are performed on the processing device 2100 side while other processes are performed on the server side.

The method can use landmarks on the drug test device 100 to locate the drug strips 110 (or a single drug strip). After the user has inserted the saliva swab 120, the drug strips 110 can generate a result based on contents of the user's saliva and display the result using a series of lines. The results can be displayed as colored lines, such as red lines, on white strips. In an embodiment, the lines can be black. The method then detects and reads the colored lines to classify each strip of the drug strips 110 of the drug test device 100.

The method of identifying the test strip region and generating a result of the drug test can include locating a label 150 on the drug test device 100. The label 150 can include, but is not limited to, a bar code, a QR code, the drug strips 110 region, a single drug test strip, edges of features visible to the camera on the drug test device 100, shapes on the label, regions on the label 150 having predetermined brightness or color, and other such patterns. The aforementioned features on the label 150 can be considered landmarks. The label 150 itself can be considered the landmark as well. The method of identifying the test strip region and generating the result of the drug test can further include locating the QR code on the label 150 of the drug test device 100, locating the bar code on the label 150 of the drug test device 100, locating the drug strips 110 region visible from outside the drug test device 100, locating the drug strips 110 in the drug strips 110 region, detecting a result on the drug test strip, and generating a result based on the result of the drug test strip.

FIG. 4 shows images of results on the drug strips 110, according to an embodiment of the present disclosure. Each strip can be read as follows: a NEGATIVE, POSITIVE, or INVALID result. A NEGATIVE result can be comprised of 2 colored stripes (or strips, or lines, or markers), a POSI- TIVE result can be comprised of a first stripe disposed near a top of the drug test strip and not include a second stripe disposed near a middle or bottom of the drug test strip, and an INVALID result can be comprised of a completely blank drug test strip or include only the second stripe disposed near a middle or bottom of the drug test strip without including the first stripe disposed near the top. It may be appreciated that other patterns of the stripes and combinations of having a predetermined number of drug strips 110 can be used to indicate the aforementioned results.

To read the drug strips 110, the method can use dimensions and details about the label 150 on the drug test device 100 to locate the drug strips 110 region including the drug strips 110. This can reduce the search area for the drug strips 110 and increase the accuracy of the search. After isolating each strip of the drug strips 110, the method can then search for individual colored result stripes to generate the evaluation. For successful scanning, the method can perform each of these steps with high confidence. Each step is discussed in detail herein.

In an embodiment, there can be multiple solutions and techniques that can be utilized to isolate the line region. Myriad methods are described herein, each with their own specific label 150 and flow. An image processing engine can be designed as a state machine. An imaging process can be comprised of a series of imaging steps. Each imaging step can be implemented by a class with a predefined interface. The flow for each method will be discussed below and a separate section will be used to discuss the specifics for each imaging step.

Figure 5:
FIG. 5 is an optical image of the drug test device including one version of the label, according to an embodiment of the present disclosure.

FIG. 5 is an optical image of the drug test device 100 including one version of the label 150, according to an embodiment of the present disclosure. In an embodiment, a subset of the drug test devices 100 deployed in the field can include the label 150 including the bar code, wherein the bar code includes a plurality of lines having a predetermined thickness and spacing, and is disposed underneath the drug strips 110 region location. The bar code can be approximately 6/7 the width of the drug strips 110 region and 1/3 the height of a line bar. By utilizing these known dimensions and the unique characteristics of the bar code, the method can, with high confidence, locate the drug strips 110 region that includes all of the drug strips 110. Once the drug strips 110 region is located, the drug strips 110 can be located to isolate each strip of the drug strips 110 for result detection.

Figure 6:
FIG. 6 is an optical image of the drug test device with predetermined regions located, according to an embodiment of the present disclosure.

To this end, FIG. 6 is an optical image of the drug test device 100 with predetermined regions located, according to an embodiment of the present disclosure. First, the label 150 can be located. Then, the bar code can be located. Then, the drug strips 110 region can be located. Then, the target drug test strip can be located in the drug strips 110 region. Finally, the result of the drug test strip (i.e., the appearance of the stripes on the strip) can be detected.

Figure 7:
FIG. 7 is an optical image of the drug test device including one version of the label, according to an embodiment of the present disclosure.

FIG. 7 is an optical image of the drug test device 100 including one version of the label 150, according to an embodiment of the present disclosure. In an embodiment, a large number of the drug test device 100s deployed in the field can have the label 150 including the bar code disposed underneath the "Premier Biotech" logo. This can prevent the method (and the processing device 2100 performing the method) from locating the relevant features. Thus, modifications can be made for locating the drug strips 110 region.

Figure 8:
FIG. 8 is an optical image of the drug test device with predetermined regions located, according to an embodiment of the present disclosure.

Instead of the bar code, the method can be modified to locate the QR Code first. To this end, FIG. 8 is an optical image of the drug test device 100 with predetermined regions located, according to an embodiment of the present disclosure. In an embodiment, the label 150 can be located first. Then, the QR code can be located. Then, the drug strips 110 region can be located. Then, the target drug test strip can be located in the drug strips 110 region. Finally, the result of the drug test strip (i.e., the appearance of the stripes on the strip) can be detected.

Figure 9:
FIG. 9 is an optical image of the drug test device including one version of the label, according to an embodiment of the present disclosure.
Figure 9:

FIG. 9 is an optical image of the drug test device 100 including one version of the label 150, according to an embodiment of the present disclosure. In an embodiment, the drug test device 100 can include a label 150 for improved landmark detection under varying lighting conditions. The label 150 can include redundant landmarks that can be used as fallback strategies during the method execution. The landmarks can be, for example, the dot with the circle circling the dot. A color of the landmark can be selected such that contrast between the landmark and the background color upon which the landmark is disposed is high.

Figure 10:
FIG. 10 is an optical image of the drug test device with predetermined regions located, according to an embodiment of the present disclosure.

To this end, FIG. 10 is an optical image of the drug test device 100 with predetermined regions located, according to an embodiment of the present disclosure. First, the label 150 can be located. Then, the drug strips 110 region was located. Then, the target drug test strip was located in the drug strips 110 region. Finally, the result of the target drug test strip (i.e., the appearance of the stripes on the drug test strip) was detected.

Described herein are imaging methods.

The method can be implemented using an engine incorporating a state machine design pattern. Any version of the method can be comprised of an array of imaging steps which are each executed sequentially. Each individual step can save metadata to an object, such as an ImageData object, that is passed to each subsequent step. Not all steps can be utilized for each version of a method. Refer to the previously described methods for a particular version of the label 150 that can correspond to which steps are executed. The design pattern can be selected for flexible interchanging of imaging steps, easier maintenance, and easier visualization.

Each step can be focused on locating the predetermined landmark(s). In an embodiment, the coordinates of the landmark as well as known properties of the landmark can then be used to reduce the search area for future landmarks. This can be done to increase the accuracy and confidence for detecting other landmarks.

Each imaging step can use a multitude of techniques to locate the target landmark. Described herein are some of the techniques used.

Contour Detection: a contour can be a curve joining all continuous points (along the boundary) having the same color or intensity. Contour detection can be used for object detection. For better results, an image can be converted to a binary format. Each pixel in the image can either have a value of 0 or 255 (black/white respectively). Conversion to a binary format can be performed by applying a threshold to an image.

Image Thresholding: for global image thresholding, a threshold value can be used to determine which pixels in an image are converted to white (255) and which pixels are converted to black (0). If the pixel value is greater than the threshold value, then the pixel is set to 255. If not, the pixel is set to 0. In an embodiment, increasing the threshold value reduces the number white pixels generated. In an embodiment, the inverse can be performed, wherein if the pixel value is greater than the threshold value, then the pixel is set to 0.

Described herein are methods of label 150 locating.

In an embodiment, since the outer dimensions of perimeter and the dimensions of the "Oral Tox" logo (as shown in the Figures) are known, the approximate location of the label 150 within the image can be found. This can be performed by focusing the contour search on the letter O's of the "Oral Tox" text in the label 150.

Figure 11:
FIG. 11 shows an example of image thresholding to locate a predetermined letter in the label under acceptable lighting conditions, according to an embodiment of the present disclosure.
Figure 12:
FIG. 12 shows an example of image thresholding to locate a predetermined letter in the label under improper lighting conditions, according to an embodiment of the present disclosure.

To this end, FIG. 11 shows an example of image thresholding to locate a predetermined letter in the label 150 under acceptable lighting conditions, according to an embodiment of the present disclosure. Moreover, FIG. 12 shows an example of image thresholding to locate a predetermined letter in the label 150 under improper lighting conditions, according to an embodiment of the present disclosure. In an embodiment, each "O" in the logo can have the unique characteristic of an elliptical contour located within another elliptical contour. An image threshold can be applied and then contours can be detected. Each contour can be analyzed for circularity and sorted in descending order. The circularity can be given as:

$$C = 4\pi \frac{A}{P^2}$$

where C=circularity, A=area, and P=perimeter. The circularity of a contour approaches 1 the closer it is to a circle. The top candidates, for example, the top ten candidates can be evaluated for internal ellipses. For example, the two largest candidates can be considered the O's. This is because the squares of the QR code may also detected. Calculations can be performed to determine an outer perimeter of the label.

Described herein are methods of QR code detection.

Figure 13:
FIG. 13 shows an example of using the label location to reduce the search area for the QR code, according to an embodiment of the present disclosure.

To this end, FIG. 13 shows an example of using the label 150 location to reduce the search area for the QR code, according to an embodiment of the present disclosure. In an embodiment, QR Code detection can be performed by converting the image to a monochrome image format. The image is then cropped to the region found by a label 150 localization process. The region can then be further cropped to the top-right quadrant of the label 150 (see FIG. 13, left). This can reduce the search area and increase the detection rate. From there a QR code scanner, such as OpenCV, can detect the QR Code. If a first QR code scanner fails, a second (custom-built) QR Code scanner can be used. This scanner can use contour detection, thresholding, and circularity previously described to locate the label 150 to detect the 3 square QR code landmarks. Once these are located, coordinates for the landmarks can be saved.

Described herein are methods of bar code detection.

Figure 14:
FIG. 14 shows an example of an image before Sobel Operator subtraction, according to an embodiment of the present disclosure.
Figure 15:
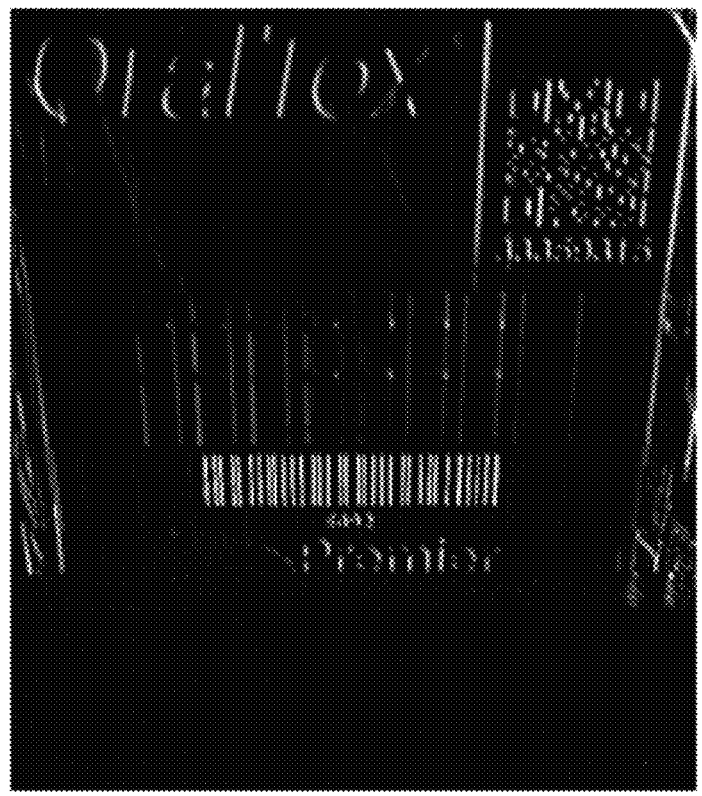
FIG. 15 shows an example of an image after Sobel Operator subtraction, according to an embodiment of the present disclosure.

To this end, FIG. 14 shows an example of an image before Sobel Operator subtraction, according to an embodiment of the present disclosure. FIG. 15 shows an example of an image after Sobel Operator subtraction, according to an embodiment of the present disclosure. In an embodiment, bar code detection can be performed as follows:

First, a similar method to locate the label 150 via cropping can be performed to crop the image. Next, the image can be resized, such as resized to a width of 480 pixels, for consistent processing across samples. Next, Sobel filters can be applied in x- and y-directions. Next, both results can be subtracted to make it easier for bar code detection. Next, blurring can be applied. Next, a threshold can be applied. Next, a morphology can be applied that fills in all contours. Next, an expansion and erode morphology can be applied to attempt to create a single white rectangle where the bar code is located.

Described herein are methods of strip region localization.

Figure 16:
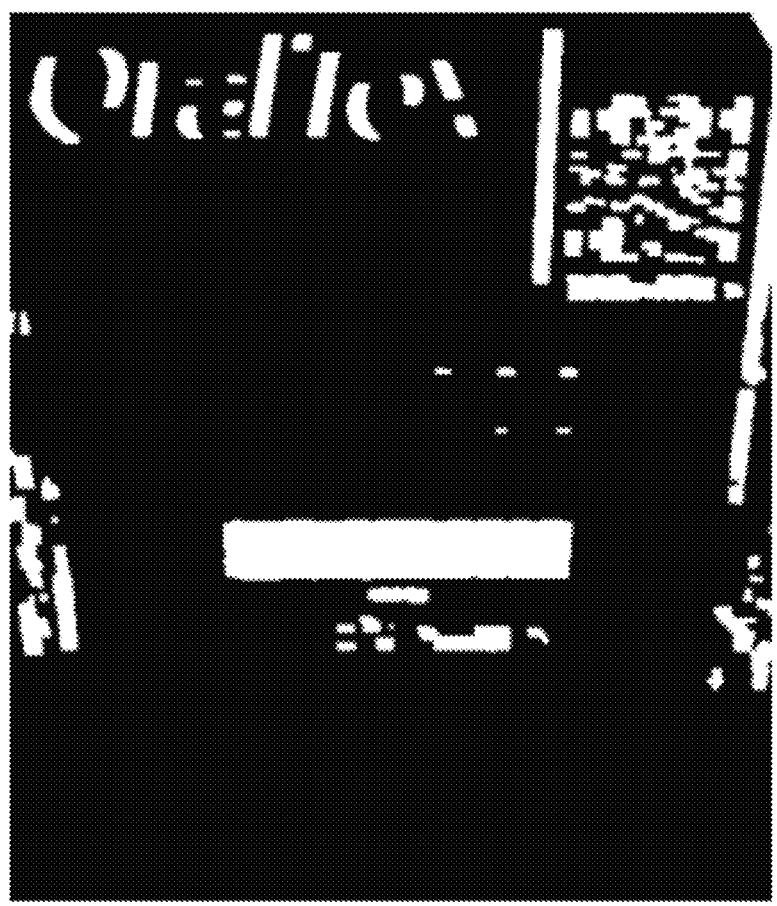
FIG. 16 shows an example of a result of locating the bar code and identifying the bar code as a white shape, according to an embodiment of the present disclosure.

To this end, FIG. 16 shows an example of a result of locating the bar code and identifying the bar code as a white shape, according to an embodiment of the present disclosure. In an embodiment, drug strips 110 region localization can use coordinates of other landmarks to find an approximate region that envelops all drug strips 110. This can be used to reduce the search area for high confidence detection.

Using QR Code: locating the drug strips 110 region can use the coordinates of the aforementioned methods that located the label 150 and the QR code. The perimeter of the located label 150 can coincide with left and right edges of the drug strips 110 region. An approximation of the drug strips 110 region height and location can be performed by using the QR Code top-left coordinate and QR Code height.

$X_{STRIP\ REGION}=X_{LABEL}$ $Y_{STRIP\ REGION}=Y_{QR\ CODE}+\text{Height}_{QR\ CODE}+\Delta Y$ $\text{Width}_{STRIP\ REGION}=\text{Width}_{LABEL}$ $\text{Height}_{STRIP\ REGION}=Y_{QR\ CODE}+\text{Height}_{QR\ CODE}+\Delta Y$ Using Bar Code: locating the drug strips 110 region using the bar code location method can be similar to locating the drug strips 110 region using the QR code location method. In this case, the bar code for a first label 150 version can be directly under the drug strips 110 region. The coordinate of the bar code can then be used to interpolate the drug strips 110 region.

$X_{STRIP\ REGION}=X_{LABEL}$ $Y_{STRIP\ REGION}=Y_{BARCODE}-3*\text{Height}_{BARCODE}$ $\text{Width}_{STRIP\ REGION}=\text{Width}_{LABEL}$ $\text{Height}_{STRIP\ REGION}=3*\text{Height}_{BARCODE}$ Using Bar Code (with a second label 150 version): landmarks are used in a second version of the label 150. The circles can mark the top and bottoms of the first and last drug test strips in the drug strips 110 region. The black squares can represent the location of every other drug test strip. The gradient can be removed for easier top detection, and dark black lines can be added to distinguish the drug strips 110 region from the rest of the label 150.

The method of locating the label 150 can be used to reduce the search area, then a contour search can be performed for the 4 circles using circularity. If not found, a scan searching for the black lines can be performed. Once 3 out of 6 landmarks are found, a warp perspective can be applied (i.e., the image can be distorted) to obtain a bird's eye view of the picture (i.e., a view of the picture wherein the keystone-like shape due to the camera perspective is corrected for).

Described herein are methods of strip localization.

In an embodiment, locating the drug strips 110 can include isolating and distinguishing each drug test strip within the drug strips 110 region. This can be performed using image thresholding.

First, the image can be converted to grayscale by applying a red-blue channel subtraction. Next, a histogram of this grayscale image can be generated. Next, the local minimum between the two rightmost relative maxima can be determined. Data has shown that many sample histograms look similar to the example in FIG. 17.

Described herein are methods of strip result detection.

Figure 17:
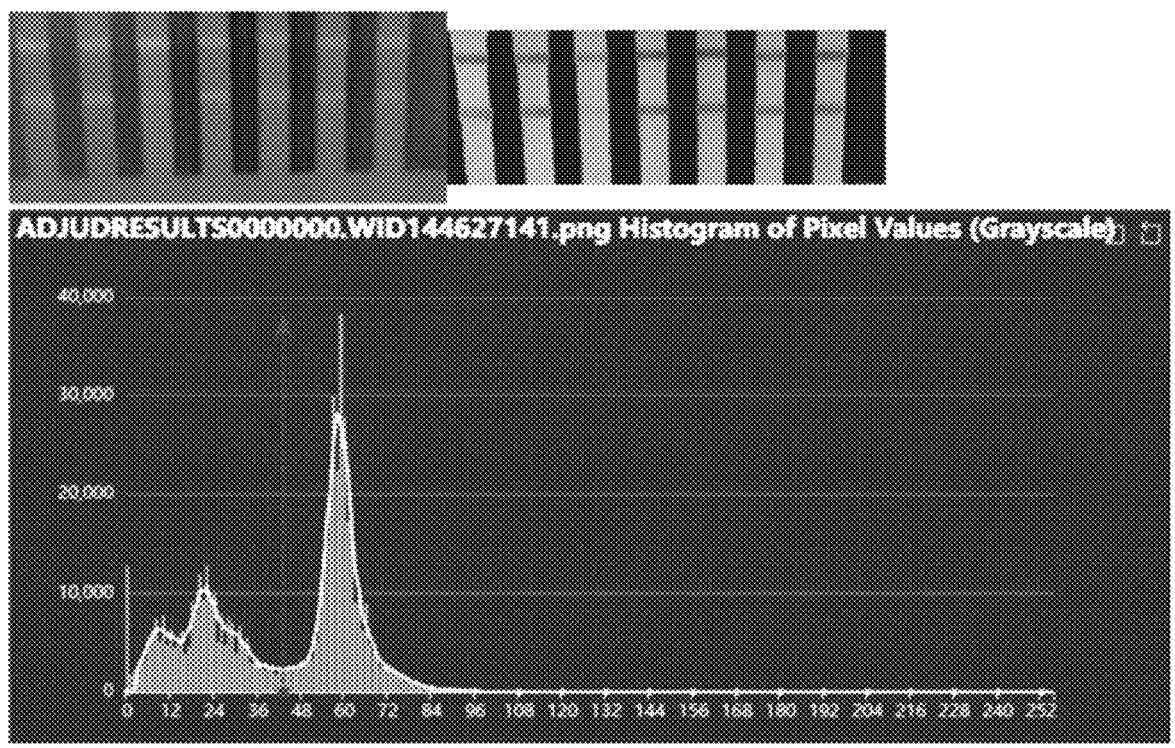
FIG. 17 is a histogram of pixel values detected in the drug strip, according to an embodiment of the present disclosure.

To this end, FIG. 17 shows an example of using histogram data to find threshold values that will highlight the drug strips 110, according to an embodiment of the present disclosure. In an embodiment, once isolated, a drug test strip can be scanned and analyzed. Using histogram data for the average pixel value of each row in a strip, a pattern can be determined to identify the colored result stripes. For example, the drug test strip can be comprised of near-white values and the result stripes can be comprised of a variation of a red hue.

Figure 18:
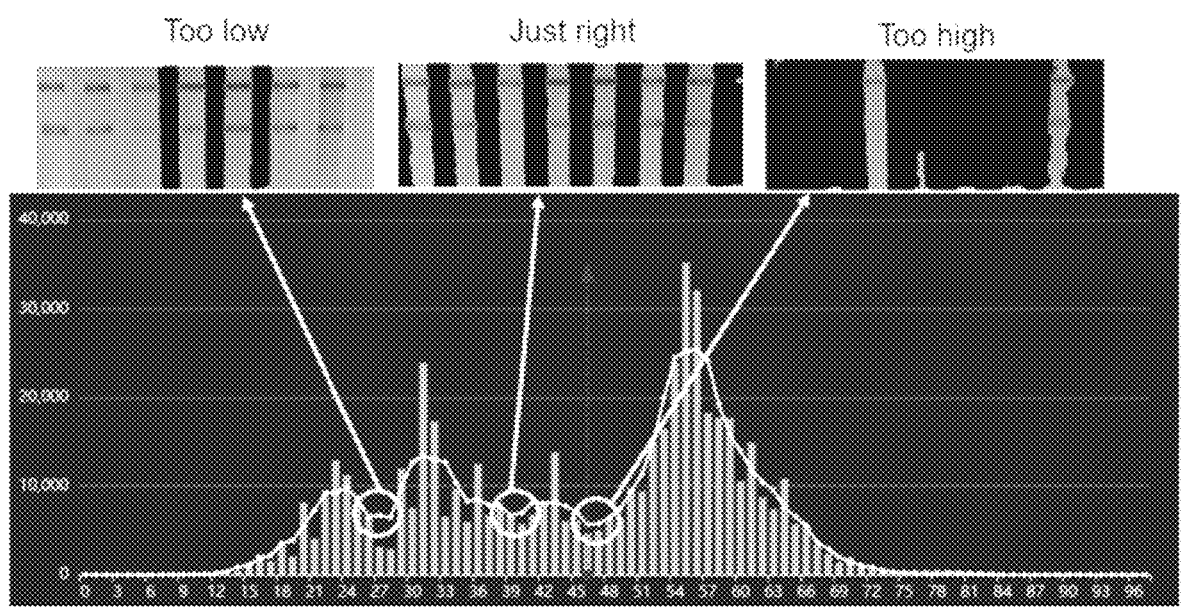
FIG. 18 shows an example of using histogram data and an iterative method to find threshold values that will highlight the drug strip, according to an embodiment of the present disclosure.

FIG. 18 shows an example of using histogram data and an iterative method to find threshold values that will highlight the drug strips 110, according to an embodiment of the present disclosure. In an embodiment, using RGB color values, the histogram data for each channel can be mapped. A result line can be identified by a significant drop in mean values for all 3 (primary) color channels. The biggest discrepancy can be seen in a green channel of the 3 color channels. Although the threshold values can be used to determine the locations of the colored stripes, there can still be the problem of noise in the histogram data. To work around this, a graph of the slope for the green channel RGB values (derivative) can be created (see FIG. 19).

Figure 19:
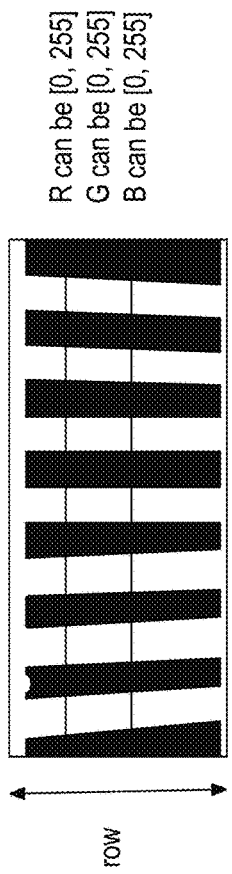
FIG. 19 shows an example of histogram data for individual drug strips, according to an embodiment of the present disclosure.
Figure 19:
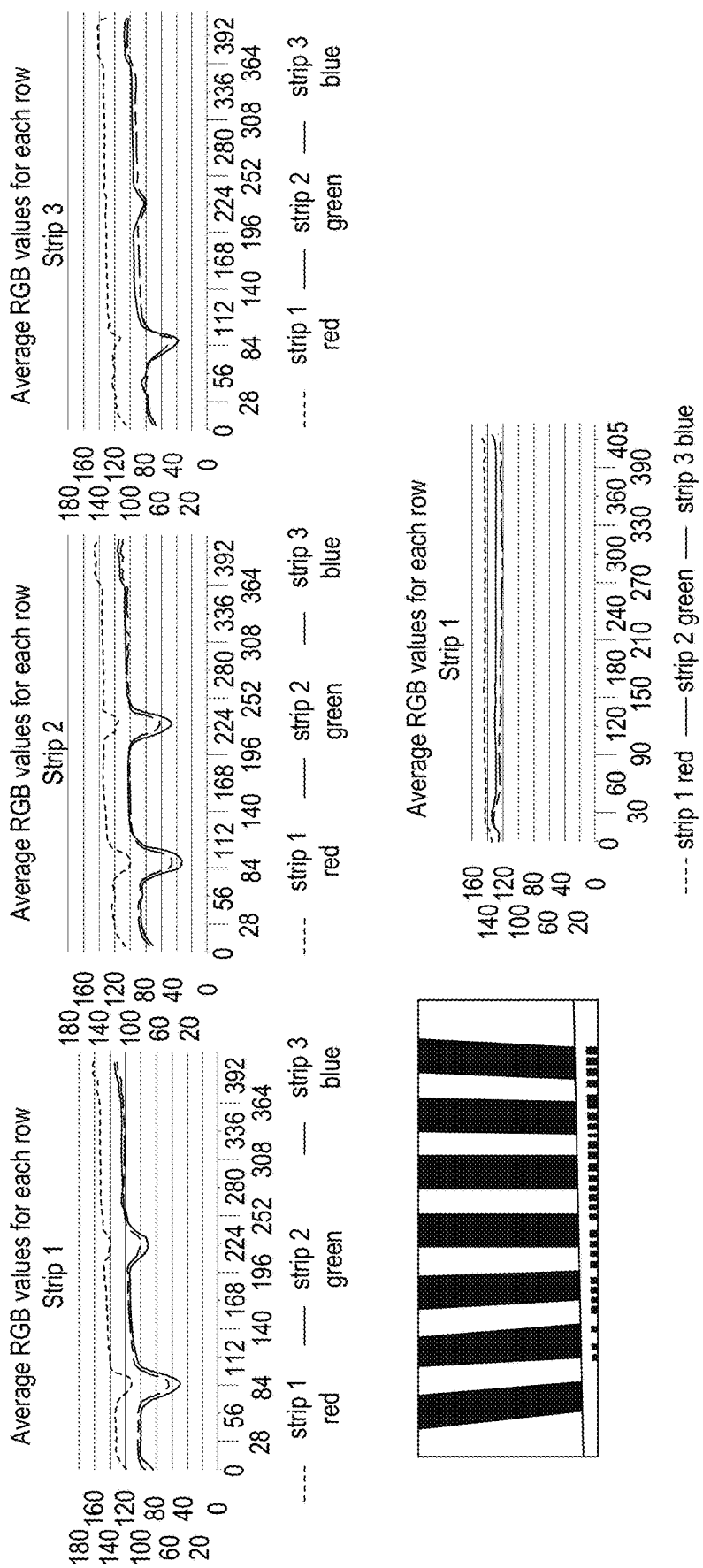

To this end, FIG. 19 shows an example of histogram data for individual drug strips 110, according to an embodiment of the present disclosure. In an embodiment, the graph of the slope for the green channel RGB values can include distinguishing features. As the x-value increases, the y-value drops to a local minimum, then continually increases (with no decrease) until a local maximum is reached. The y-value then decreases as it approaches 0. Since background noise values are close to zero, a scale factor can be applied that enhances the signal for these graphs with negligible increase to noise amplitudes.

Figure 20:
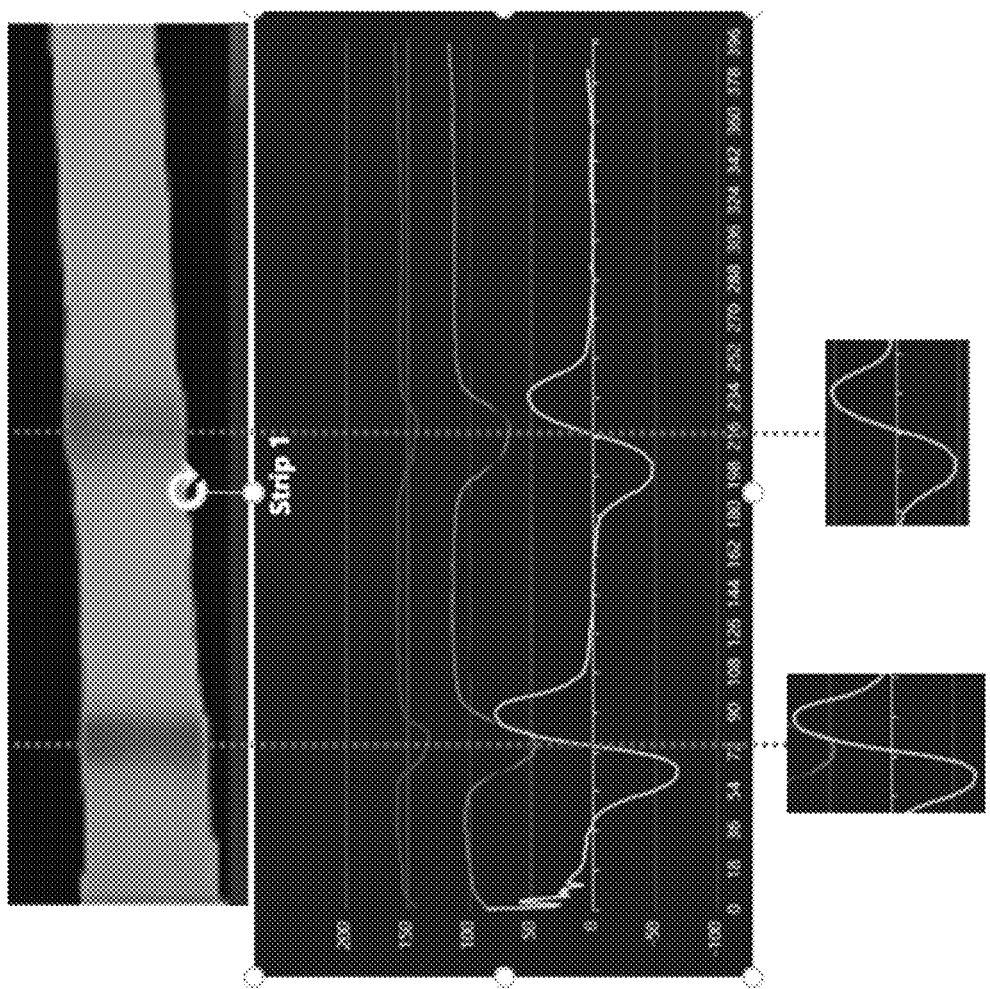
FIG. 20 shows an example of using the slope of the RGB values curve to identify the location of the colored stripes in the drug test strips, according to an embodiment of the present disclosure.
Figure 20:
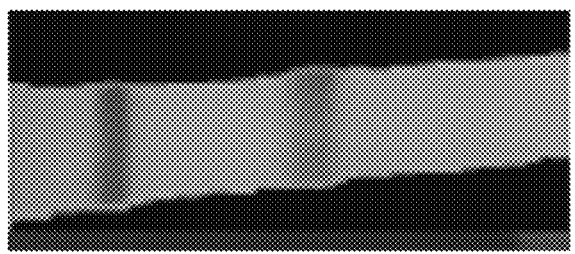

FIG. 20 shows an example of using the slope of the RGB values curve to identify the location of the colored stripes in the drug strips 110, according to an embodiment of the present disclosure. In an embodiment, the point where these identifying graphs of the slopes cross zero also mark the exact y-coordinate of the colored stripe detected (refer to FIG. 20 for an example).

Figure 21A:
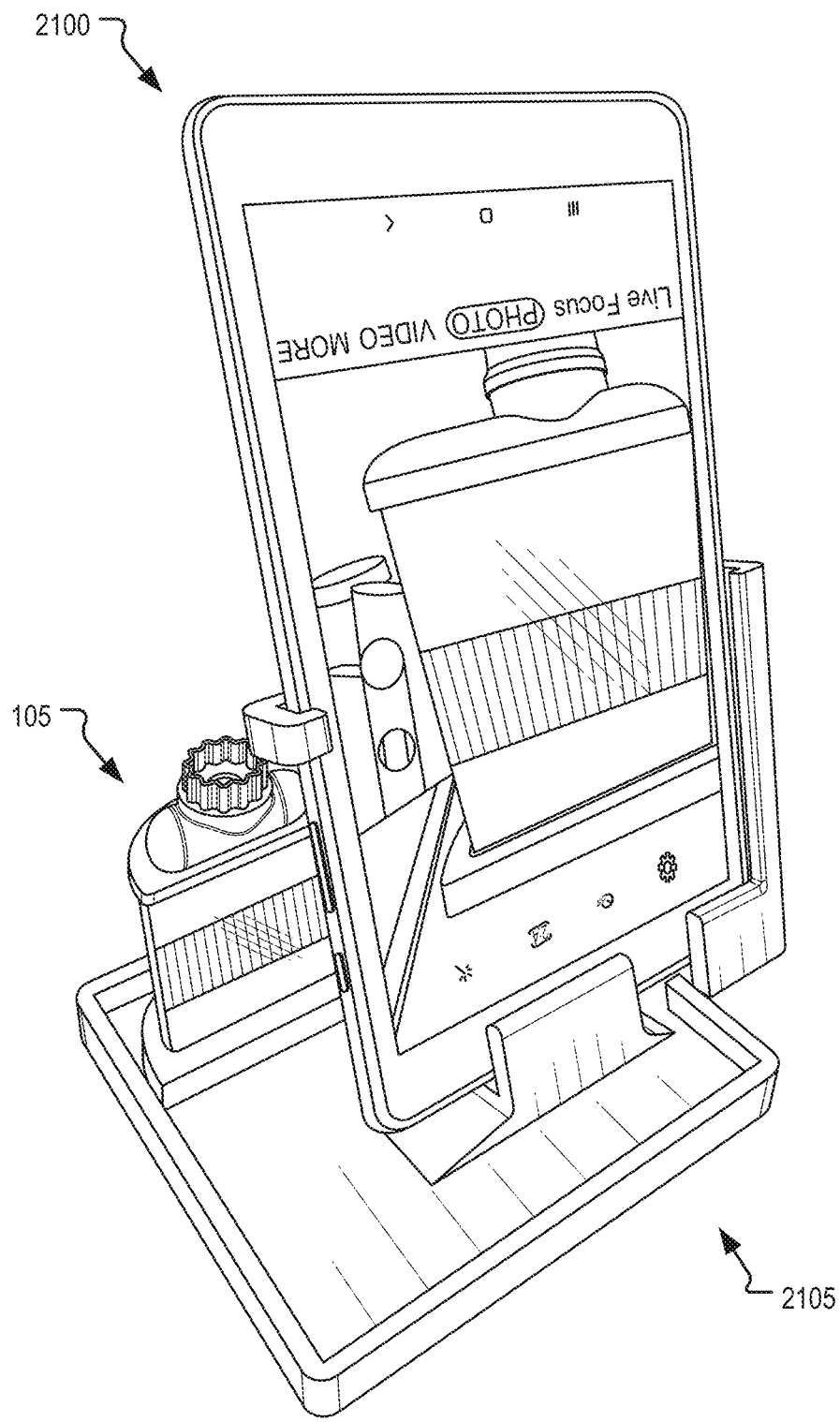
FIG. 21A is a schematic of a screening apparatus, according to an embodiment of the present disclosure.
Figure 21B:
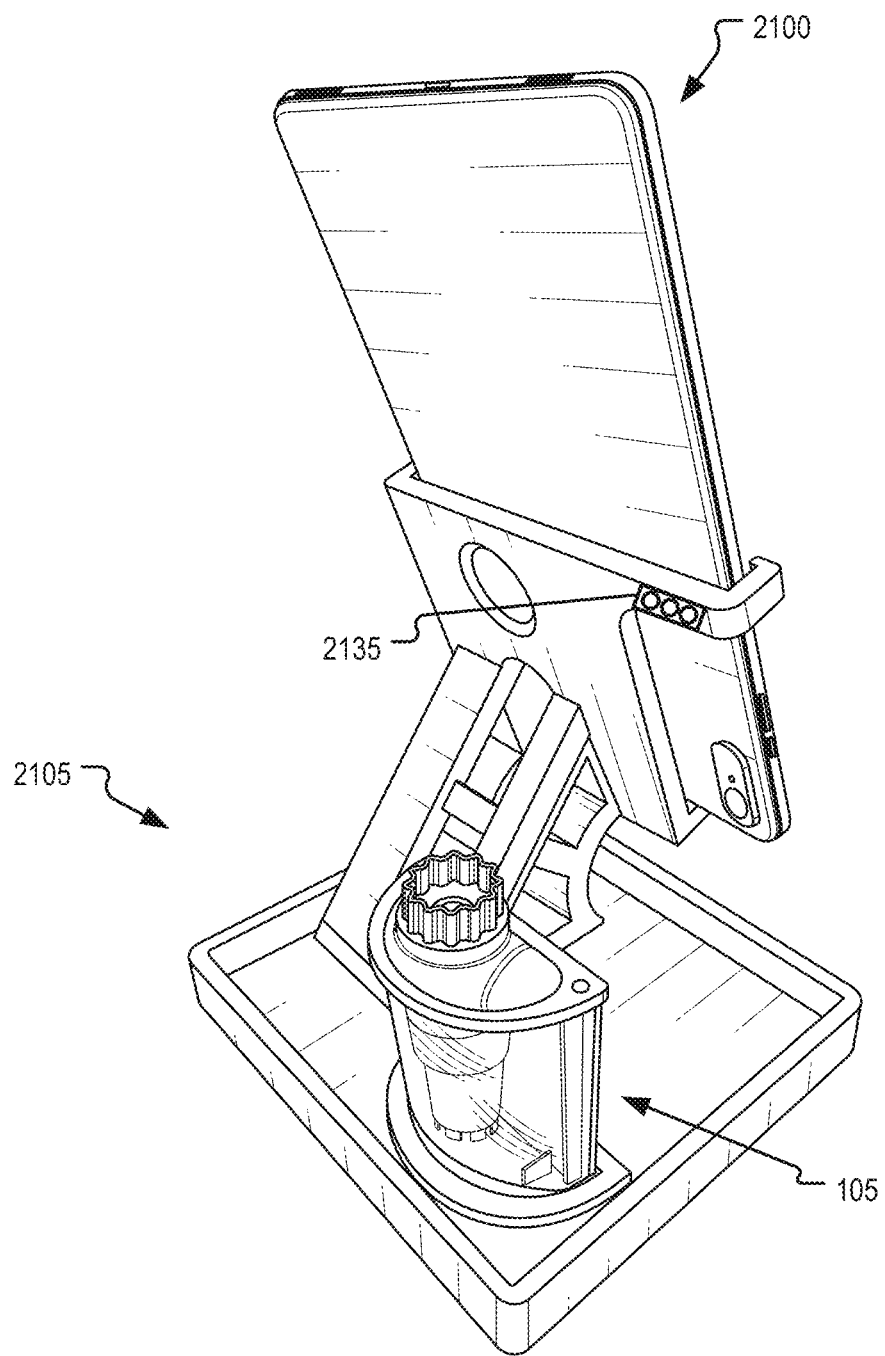
FIG. 21B is a schematic of a screening apparatus from a second perspective, according to an embodiment of the present disclosure.

A method of screening an applicant is described herein. To this end, FIG. 21A is a schematic of a screening apparatus, according to an embodiment of the present disclosure. FIG. 21B is a schematic of a screening apparatus from a second perspective, according to an embodiment of the present disclosure. In an embodiment, the applicant arrives at a screening location (recruiting center). Then, a badge photo is created. Then, the applicant information can be verified. Then, the applicant can go through the drug screening process. Then, the results of the drug test from the drug screening process can be confirmed and displayed. Before the applicant enters, each station at the screening location can include the screening apparatus, including the drug test device 100, a processing device 2100, a device stand 2105 to hold the processing device 2100, a mirror, a PMV (Process Map Visual), and cleaning supplies.

Figure 22A:
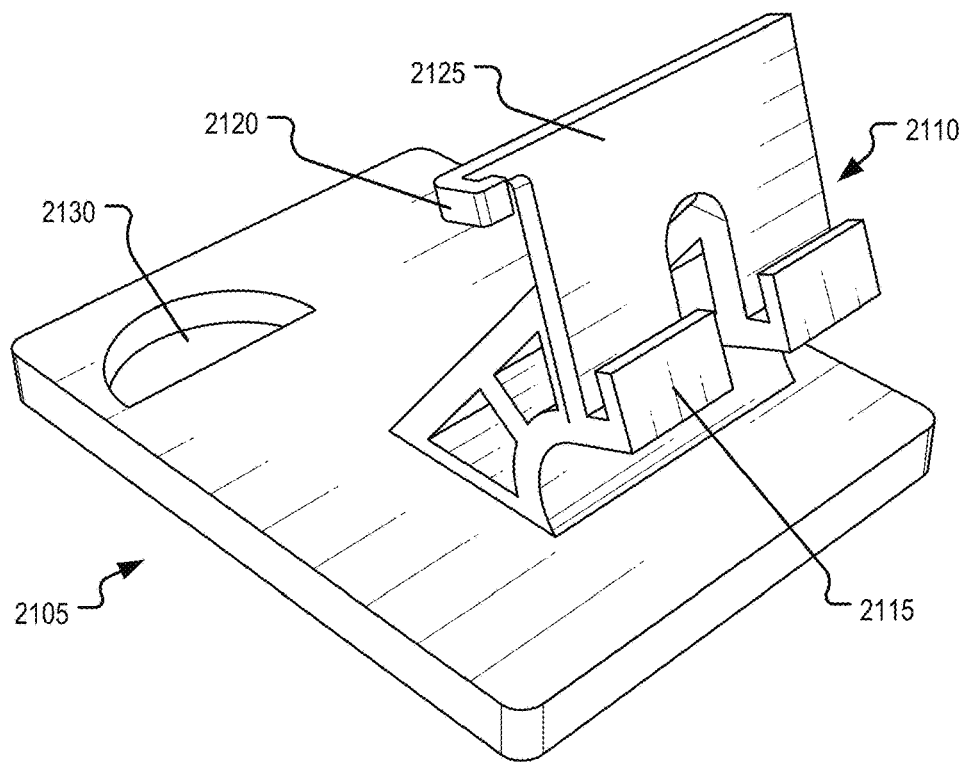
FIG. 22A is a schematic of the device stand, according to an embodiment of the present disclosure.
Figure 22B:
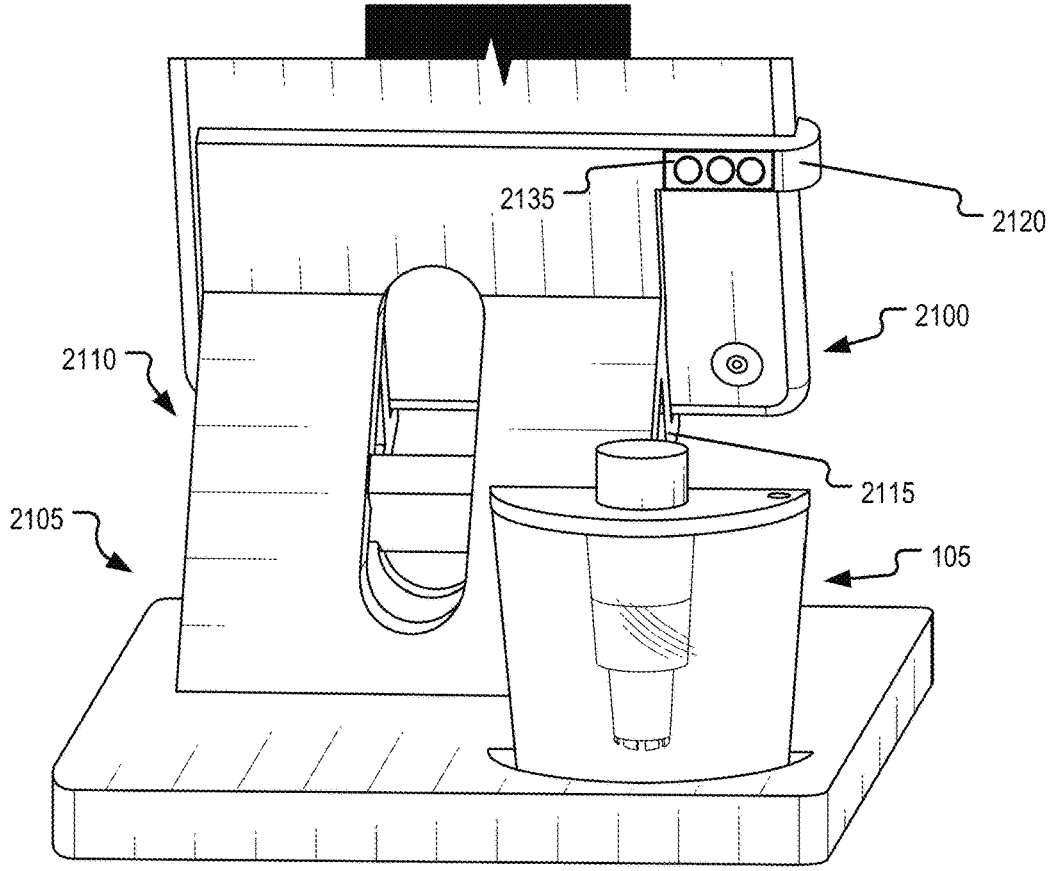
FIG. 22B is a schematic of the device stand having the processing device and drug test device 100 inserted therein, according to an embodiment of the present disclosure.

FIG. 22A is a schematic of the device stand 2105, according to an embodiment of the present disclosure. FIG. 22B is a schematic of the device stand 2105 having the processing device 2100 and drug test device 100 inserted therein, according to an embodiment of the present disclosure. The device stand 2105 can include a base and a mount 2110 attached to the base configured to couple with the processing device 2100. For example, the processing device 2100 is a tablet and the mount 2110 has dimensions substantially similar to dimensions of the tablet to fasten the tablet to the mount 2110 and thereby to the device stand 2105. In an embodiment, the mount 2110 can include a bottom platform 2115 and a first side arm 2120. Additionally, the mount 2110 can include a second side arm. A distance separating the first side arm 2120 and the second side arm can be slightly wider than a width of the tablet. The bottom platform 2115 can be formed perpendicular to a backplate 2125 along a bottom of the backplate 2125, the bottom platform 2115 including a retention wall formed as part of the bottom platform 2115 distant from the portion of the bottom platform 2115 attached to the backplate 2125, the retention wall being perpendicular to the bottom platform 2115.

The tablet can be inserted into the mount 2110, where a first surface of the tablet will slide down the mount 2110 along the backplate 2125 until a first edge of the tablet abuts the bottom platform 2115, and the first side arm 2120 and the second side arm prevent the tablet from moving laterally. The first surface can be, for example, a back surface of the tablet, such that an opposite front surface having a display or screen faces the applicant or user. The retention wall can prevent the first edge of the tablet from sliding off the bottom platform 2115. In an embodiment, the second side arm is not included in the mount 2110 and the tablet can be inserted into the mount 2110, where the tablet will slide down the mount 2110 until the bottom of the tablet abuts the bottom platform 2115, then the tablet is translated laterally until a second edge of the tablet abuts the first side arm 2120, the second edge being perpendicular to the first edge. As shown, the bottom platform 2115 can be split into two platforms and the backplate 2125 of the mount 2110 includes a cutout that extends through the bottom platform 2115 to allow easy removal of the tablet by pushing the tablet up from the exposed portion of the tablet in the cutout. The cutout can also allow a camera disposed along a center of the tablet to be exposed. For tablets having the camera disposed along a corner of the tablet, the camera of the tablet will not be obstructed by the bottom platform 2115 being slightly narrower than the width of the tablet. Such a fastening system can secure the tablet while keeping the display relatively free of obstructions when viewed by the applicant.

The mount 2110 of the device stand 2105 can couple the processing device 2100 while also angling the processing device 2100 at a predetermined angle to face the display of the processing device 2100 towards the applicant. The predetermined angle of the processing device 2100 coupled to the mount 2110 can also provide a fixed angle for a camera of the processing device 2100 to face in an opposite direction of the display. Furthermore, the device stand 2105 can include a notch 2130 or holder configured to receive the drug test device 100. In an embodiment, the notch 2130 can be a hollow recess and a cross-sectional shape of the hollow portion can be substantially similar to a cross-sectional shape of the drug test device 100 such that the drug test device 100 can be arranged into the notch 2130. For example, the drug test device 100 can be slid or dropped into the notch 2130. The hollow portion may obstruct a portion of the drug test device 100, such as the label 150 on the drug test device 100.

As such, in an embodiment, the notch 2130 can have a similar fastening method as the mount 2110 and allow the user to slide the drug test device 100 into the notch 2130. Such a fastening method (i.e., having a bottom platform 2115 and side arms or lateral movement restrictors) can reduce any obstruction that may arise due to a sidewall of the aforementioned hollow notch 2130 blocking the label. Moreover, in any case, the notch 2130 can also angle the drug test device 100 at a predetermined angle to facilitate image capture of the label 150 via the camera on the processing device 2100. Additionally, the device stand 2105 can include a light source 2135 for assisting in image capture when the lighting environment of the screening location is poor, such as being too dim. The light source 2135 can be integrated into a structure of the device stand 2105. The light source 2135 can be disposed on a side of the mount 2110 more closely aligned with a position of the notch 2130, and eventually the drug test device 100 received therein. In an embodiment, the light source 2135 is disposed on the first side arm 2120. Notably, an angle of the light source 2135 can match that of the angle of the mount 2110. In an embodiment, the light source 2135 can be attached to or formed as part of the first side arm 2120 having an integrated angle adjustment rotation drum configured to allow a user to rotate the drum and thus the angle of the light source 2135 to reduce any potential glare from a direct reflection back into the camera of the tablet. The light source 2135 can be powered via an external power source. In an embodiment, the angle and power of the light source 2135 can be controlled remotely by an operator. The operator can adjust an intensity of the light source 2135 by adjusting the power to the light source 2135. The operator can also adjust the angle of the light source 2135 by adjusting the angle adjustment rotation drum, which can include a motor or servo configured to receive power from the external power source or any power source described herein. In an embodiment, instructions can be sent by the remote operator to the processing device 2100 to adjust the angle and power of the light source 2135 via regulating the power to the light source and actuating the motor of the angle adjustment rotation drum to which the light source 2135 is attached or formed thereon.

The tablet can similarly be powered via the external power source. In the event the light source 2135 and the tablet include internal rechargeable batteries, the external power source can charge (i.e., power) the internal batteries. The external power source can be, for example, a wall outlet. In an embodiment, the device stand 2105 can be electrically connected to the external power source and the device stand 2105 can include circuitry to divert power to any device electrically connected to the device stand 2105. For example, the light source 2135 can be wired to the structure of the device stand 2105 via the circuitry and the tablet can couple to a charging dock integrated into the bottom platform 2115 of the mount 2110 that is connected to the circuitry. As such, cable clutter can be reduced. In an embodiment, the device stand 2105 can include an internal battery that can be charged and configured to power the tablet and the light source 2135 during deployment in the screening location. Notably, the light source 2135 can be configured to activate when the camera of the processing device 2100 obtains an image of the drug test device 100.

In an embodiment, the applicant can be pre-registered, such as via a batch order process. In an embodiment, the batch order process includes obtaining a batch template, entering data into fields of the batch template, uploading the batch template (spreadsheet), and reviewing the uploaded batch templates for accuracy and errors.

In an embodiment, the applicant may not be pre-registered, and may be a walk-in to the screening location. For such an applicant, the applicant can be processed with a modified process.

In an embodiment, the applicant can arrive at a station in the screening location. The station can include the device stand 2105 holding the processing device 2100, wherein the device stand 2105 is affixed to a surface, such as a kiosk. The applicant can interact with the processing device 2100 to begin the drug screening process. For example, the applicant can press an icon, such as a play button, displayed on a display of the processing device 2100 to start the drug screening process. The applicant can then follow prompts including text-based instructions displayed by the processing device 2100 to step through the drug screening process. Steps can include inputting predetermined data related to the applicant for identification (ID) verification, providing a signature for consenting to the drug screening process, and following instructions to use the drug test device 100. The prompts can be accompanied by audio instructions output by the processing device 2100.

In an embodiment, at a first screen (after an initial screen including the play button), the processing device 2100 can display fields for the applicant to enter ID information. The on-screen instructions can be, for example, "Let's get started!" A script for the audio instructions can be, for example, "Let's get your drug test started. This should take 7-10 minutes. Enter your last name, date of birth and booth number. Booth number is posted nearby." An audio file for the corresponding audio instructions can be stored on the processing device 2100 or a server.

In an embodiment, at a second screen, the processing device 2100 can display the input ID information and request the applicant to confirm the input ID information by pressing a button to confirm, or pressing another button to edit the input ID information. The on-screen instructions can be, for example, "Review your information. Make sure we have your phone number correct." A script for the audio instructions can be, for example, "Is this your preferred contact number? Tap the edit button if not." An audio file for the corresponding audio instructions can be stored on the processing device 2100 or a server.

In an embodiment, at a third screen, the processing device 2100 can display a consent statement to use an electronic signature and request the applicant to use their finger to input an electronic signature to confirm their consent. The on-screen instructions can be, for example, "Consent to use Electronic Signature." and/or "Consent to Drug Screening Process." A script for the audio instructions can be, for example, "Review the information and provide your consent for your drug test process. Using your finger, sign your name and tap next." An audio file for the corresponding audio instructions can be stored on the processing device 2100 or a server.

In an embodiment, at a fourth screen, the processing device 2100 can display instructions to prepare the drug test device 100. The on-screen instructions can be, for example, "Open the pouch. Take the device out of the pouch and place it upright on the table. You may now throw the pouch in the trash." A script for the audio instructions can be, for example, "Locate the silver pouch on the table in front of you. Tear open the pouch using the notches on the side or top, place the device upright on the table leaving the swab in the device." An audio file for the corresponding audio instructions can be stored on the processing device 2100 or a server.

In an embodiment, at a fifth screen, the processing device 2100 can display instructions to prepare the applicant for the drug test device 100. The on-screen instructions can be, for example, "Pool saliva in your mouth. Think of your favorite food. Pool saliva in your mouth. The more the better. If you don't provide enough of a sample you will have to re-take the test." A script for the audio instructions can be, for example, "This drug test will use your saliva. Take a few moments to pool saliva in your mouth. You may use the side of your cheek to store the saliva. If it helps, think of your favorite food. The more the better. If you don't provide enough of a sample you will have to re-take the test." An audio file for the corresponding audio instructions can be stored on the processing device 2100 or a server.

In an embodiment, at a sixth screen, the processing device 2100 can display instructions to use the saliva swab 120 of the drug test device 100. The on-screen instructions can be, for example, "Collect the Sample. Insert the sponge in your mouth once you pool the saliva. Soak the sponge in your mouth to saturate. The more the better. Using the mirror, check to see if the indicator strip turns red. DO NOT remove the swab until the indicator appears. This may take approximately 2 minutes." A script for the audio instructions can be, for example, "Leave the container upright on the table at all times. Insert the sponge into your mouth. Saturate the sponge with your saliva. DO NOT suck on the sponge. This will take some time. When the timer ends, use the mirror provided to look for a red indicator on the stick of the sponge. If it is not red, pool more saliva and wait. [Pause 90 secs]. DO NOT remove the swab until the indicator appears. I would like to emphasize, DO NOT remove the swab until the indicator appears." The audio instructions can pause in the middle of the script, where indicated with brackets. An audio file for the corresponding audio instructions can be stored on the processing device 2100 or a server.

In an embodiment, at a seventh screen, the processing device 2100 can display instructions to insert the saliva swab 120 into the drug test device 100. The on-screen instructions can be, for example, "Insert Swab. Hold the device with one hand while it remains upright on the table. Insert the swab into the device and press down while twisting the cap closed." A script for the audio instructions can be, for example, "Remove the sponge from your mouth. Hold the device while it remains upright on the table. Insert the swab into the device and press down firmly while twisting the cap closed. Leave the device upright on the table with the OralTox logo facing you." An audio file for the corresponding audio instructions can be stored on the processing device 2100 or a server.

In an embodiment, at an eighth screen, the processing device 2100 can display instructions to wait for the drug test device 100 to generate results. The on-screen instructions can be, for example, "Wait. Leave the device upright on the table. Wait until you see results. Results may vary." A script for the audio instructions can be, for example, "Leave it upright on the surface, no touching. Your device will process your saliva in approximately 2 minutes. [Pause for 1:50 minutes] WITHOUT touching the device, look for red lines to appear on the strips. [Pause] Don't worry if some of the strips take longer than others. Some lines may be faint and different colors." The audio instructions can pause in the middle of the script, where indicated with brackets. An audio file for the corresponding audio instructions can be stored on the processing device 2100 or a server.

In an embodiment, at a ninth screen, the processing device 2100 can display instructions to confirm the results are displayed in the drug test device 100. The on-screen instructions can be, for example, "Wait. Can you see one or two lines on every strip?" A script for the audio instructions can be, for example, "Do not touch the device. Can you confirm that you see at least one line on every strip?" An audio file for the corresponding audio instructions can be stored on the processing device 2100 or a server.

In an embodiment, at a tenth screen, the processing device 2100 can display instructions to image the results. The on-screen instructions can be, for example, "Leave the device upright on the table. Make sure we can clearly see the:" A script for the audio instructions can be, for example, "Place the device in the recess labeled "B". Tap I'm ready and then take a photo of your results." An audio file for the corresponding audio instructions can be stored on the processing device 2100 or a server.

In an embodiment, at an eleventh screen, the processing device 2100 can display instructions to confirm the captured image of the results. The on-screen instructions can be, for example, "Can you see one or two lines on every strip? Note, some lines may be darker than others." A script for the audio instructions can be, for example, "Are you happy with the photo? Can you see the red lines on the strips clearly? You can re-take the photo if needed." An audio file for the corresponding audio instructions can be stored on the processing device 2100 or a server.

In an embodiment, at a twelfth screen, the processing device 2100 can display instructions to wait and review the results. The on-screen instructions can be, for example, "Don't go anywhere! The screen will update with instructions shortly."

In an embodiment, at a thirteenth screen, the processing device 2100 can display instructions to save the drug test device 100 and clean the station. The on-screen instructions can be, for example:

"Do not throw away your test

1. Wipe down your station and tablet
2. Throw away silver pouch and any other trash
3. Use some hand sanitizer Deposit your test 1. Deposit your test kit in the bin labeled C
2. Proceed out the exit."

A script for the audio instructions can be, for example, "Do not throw away your test. You are almost done! 1. Wipe down your station and tablet. 2. Throw away silver pouch and any other trash. 3. Use some hand sanitizer. Deposit your test kit in the bin labeled C and proceed out the exit. Thank you!" An audio file for the corresponding audio instructions can be stored on the processing device 2100 or a server.

In an embodiment, the results from the drug test device 100 can have some results that are unclear, for example because of poor lighting conditions. In such an event, the results of the drug screening can be sent to an administrator to adjudicate. The administrator can also monitor the applicant during the drug screening process. In an embodiment, the administrator can use a second processing device (such as a computer) with an application installed to perform the adjudication. The second processing device can prompt the administrator to log in to the application and thereby certify the administrator as having clearance to adjudicate the drug test results. The second processing device can prompt the administrator to select a location of the screening location the administrator wants to adjudicate results for. In an embodiment, the administrator can adjudicate results for multiple locations and can switch between locations via, for example, a drop-down menu in the displayed prompt. The second processing device can retrieve all drug screening tests currently in progress and display the results to the administrator. Each result can include, for example, the name of the applicant, a description of the step the applicant is currently on, and a total time of the drug screening test. Each result can be displayed as a card (or it can be displayed as a shape, a patch, or similar rendered digital object) on the display of the second processing device.

In an embodiment, the applicant can request assistance with his/her drug screening test and the processing device 2100 can transmit the request to the second processing device. The second processing device can receive the request for assistance and prompt the administrator to take action. For example, the second processing device can change an appearance of the card from white to red in color. Upon completion of assisting the applicant, the second processing device can prompt the administrator to input any comments regarding the interaction with the applicant and his/her drug screening test. In an embodiment, the processing device 2100 can keep track of an elapsed time for the applicant going through the drug screening test. Upon the elapsed time exceeding a predetermined length, the processing device 2100 can transmit a notification to the second processing device, and the second processing device can alert the administrator by changing the appearance of the card. For example, if the applicant exceeds a predetermined time (for example, 2 hours for the drug screening test, the card for the applicant can change to yellow in color.

In an embodiment, when the results of the drug screening test are ready for adjudication, the processing device 2100 can send a notification to the second processing device and the second processing device can change the appearance of the applicant's card to green in color. The administrator can click on the green card to begin adjudication.

In an embodiment, the second processing device can display an image of the test results from the drug test device 100 that was uploaded by the applicant as well as a prompt to select what the administrator determines to be a condition of the result of the drug screening test based on the picture. The administrator can select among predetermined options for the conditions, such as "Clear," "Inconclusive," and "Invalid," wherein each condition can be accompanied by a schematic demonstrating example patterns of stripes represented by each condition. In an embodiment, the administrator can select an option to have the applicant re-take the photo. That is, for the re-take photo option, the second processing device will send a notification to the processing device 2100 to prompt the applicant to take another photo of the results.

In an embodiment, the administrator can select the "Clear" condition and the second processing device can prompt the administrator to certify the results with an electronic signature of the administrator. The administrator can sign and submit the signature in the corresponding field displayed by the second processing device.

In an embodiment, the administrator can select the "Inconclusive" condition and the second processing device can prompt the administrator to indicate which drug test strips have inconclusive results. For example, the second processing device can display a schematic of the drug test device 100 having the drug test strips included therein, wherein the administrator can interact with the schematics of the drug test strips. That is, the administrator can click on the schematics of the drug test strips that correspond to the position of the actual drug test strip with inconclusive results. Again, the administrator can provide the electronic signature to certify and submit the determination. Similarly, the administrator can change the adjudicated determination of a result by selecting, for example, a "Change Adjudication" link which can lead back to the schematic of the drug test device 100 with the schematics of the drug test strips.

In an embodiment, when the administrator adjudicates the condition as "Invalid," the administrator can sign with the electronic signature to certify and submit the determined result. Upon submitting the "Invalid" condition, the second processing device can send a notification to the processing device 2100 to instruct the applicant to contact the administrator and obtain a second drug test device 100 and re-take the test.

In an embodiment, once the test is complete, the applicant's card can display in a Completed Tests view on a dashboard in the application on the second processing device. For example, the completed tests for a current day can display on the dashboard. For example, the administrator can search for completed tests by an applicant's full first and last name from, for example, the past 24 hours and 48 hours.

Figure 23:
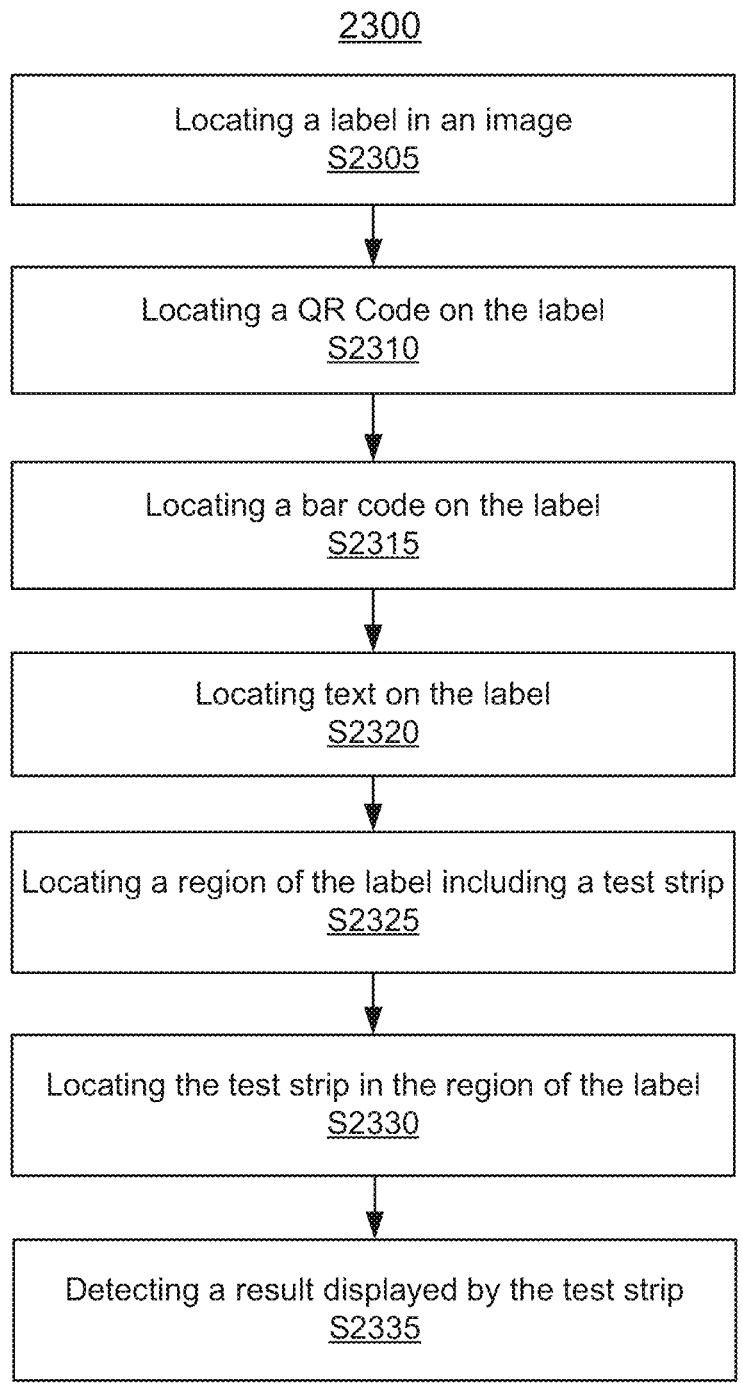
FIG. 23 is an exemplary flow chart of a method described herein, according to an embodiment of the present disclosure.

FIG. 23 is a flow chart for a method 2300, according to an embodiment of the present disclosure. In an embodiment, step S2305 is locating, via processing circuitry, a label 150 in an image, the label 150 including a QR code, a bar code, and text displayed on the label. Step S2310 is locating, via the processing circuitry, the QR code on the label. Step S2315 is locating, via the processing circuitry, the bar code on the label. Step S2320 is locating, via the processing circuitry, the text on the label. Step S2325 is locating, via the processing circuitry, a region of the label including a test strip, the test strip configured to display a result of a drug screening test. Step S2330 is locating, via the processing circuitry, the test strip in the region of the label. Step S2335 is detecting, via the processing circuitry, the result displayed by the test strip.

Embodiments of the subject matter and the functional operations described in this specification are implemented by processing circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of a data processing apparatus/device, (such as the processing device 2100, the second processing device, or the like). The computer storage medium can be a machine-readable storage device, a machine-readable storage substrate, a random or serial access memory device, or a combination of one or more of them.

The term "data processing apparatus' refers to data processing hardware and may encompass all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, Subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA an ASIC.

Computers suitable for the execution of a computer program include, by way of example, general or special purpose microprocessors or both, or any other kind of central processing unit. Generally, a CPU will receive instructions and data from a read-only memory or a random access memory or both. Elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients (user devices) and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 24:
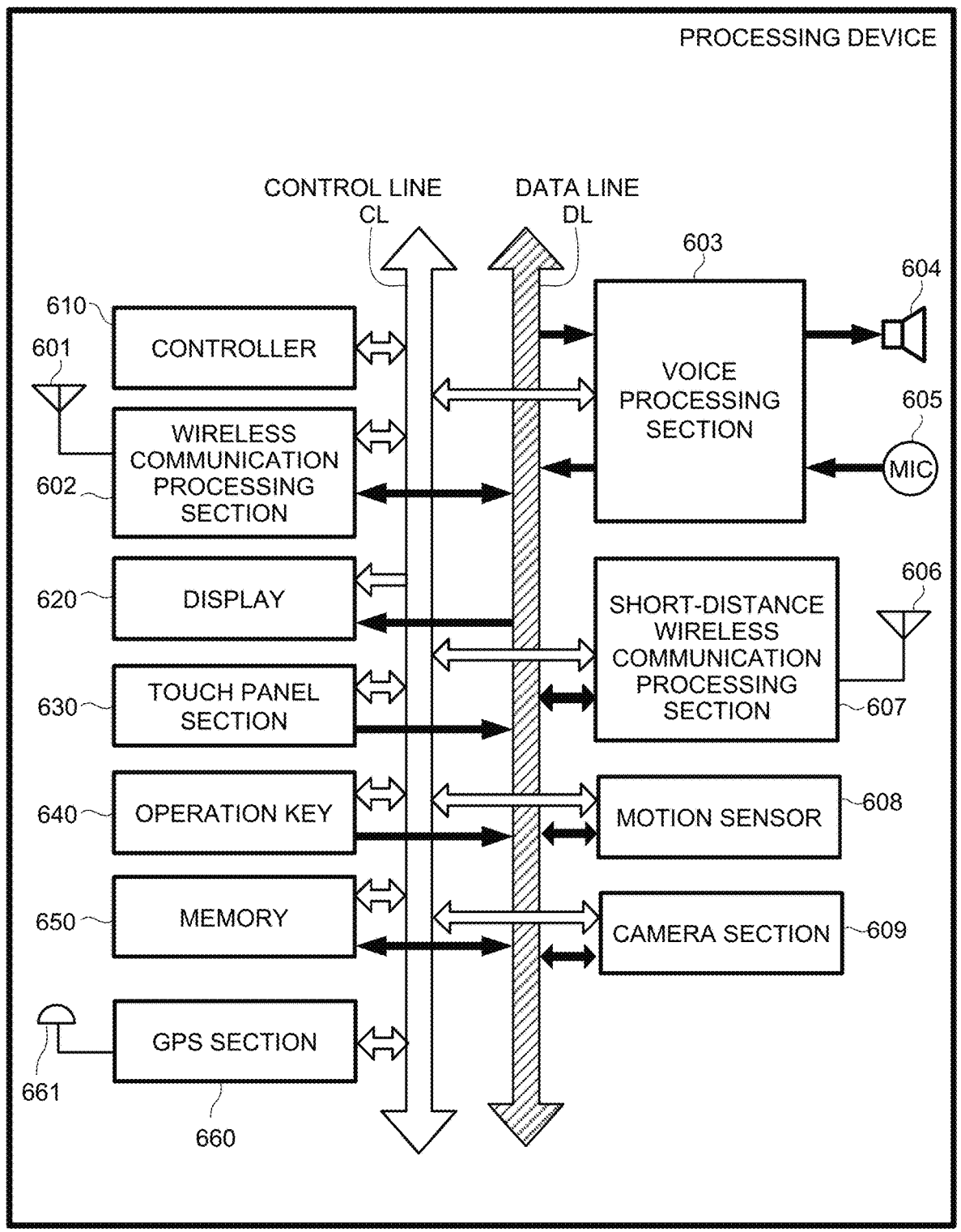
FIG. 24 is a schematic of a user device for performing a method, according to an exemplary embodiment of the present disclosure.

An example of the processing device 2100 is shown in FIG. 24. FIG. 24 is a more detailed block diagram illustrating an exemplary electronic processing device, according to an embodiment of the present disclosure. In an embodiment, the processing device may be a smartphone. However, the skilled artisan will appreciate that the features described herein may be adapted to be implemented on other devices (e.g., a laptop, a tablet, a server, an e-reader, a camera, a navigation device, etc.). The processing device of FIG. 24 includes processing circuitry, as discussed above. The processing circuitry includes one or more of the elements discussed next with reference to FIG. 24. The processing device includes a controller 610 and a wireless communication processor 602 connected to an antenna 601. A speaker 604 and a microphone 605 are connected to a voice processor 603.

The controller 610 may include one or more processors (CPU, GPU, or other circuitry) and may control each element in the processing device to perform functions related to communication control, audio signal processing, graphics processing, control for the audio signal processing, still and moving image processing and control, and other kinds of signal processing. The controller 610 may perform these functions by executing instructions stored in a memory 650. Alternatively, or in addition to the local storage of the memory 650, the functions may be executed using instructions stored on an external device accessed on a network or on a non-transitory computer readable medium.

The memory 650 includes but is not limited to Read Only Memory (ROM), Random Access Memory (RAM), or a memory array including a combination of volatile and non-volatile memory units. The memory 650 may be utilized as working memory by the controller 610 while executing the processes and algorithms of the present disclosure. Additionally, the memory 650 may be used for long-term storage, e.g., of image data and information related thereto.

The processing device includes a control line CL and data line DL as internal communication bus lines. Control data to/from the controller 610 may be transmitted through the control line CL. The data line DL may be used for transmission of voice data, display data, etc.

The antenna 601 transmits/receives electromagnetic wave signals between base stations for performing radio-based communication, such as the various forms of cellular telephone communication. The wireless communication processor 602 controls the communication performed between the processing device and other external devices via the antenna 601. For example, the wireless communication processor

602 may control communication between base stations for cellular phone communication.

The speaker 604 emits an audio signal corresponding to audio data supplied from the voice processor 603. The microphone 605 detects surrounding audio and converts the detected audio into an audio signal. The audio signal may then be output to the voice processor 603 for further processing. The voice processor 603 demodulates and/or decodes the audio data read from the memory 650 or audio data received by the wireless communication processor 602 and/or a short-distance wireless communication processor 607. Additionally, the voice processor 603 may decode audio signals obtained by the microphone 605.

The exemplary processing device may also include a display 620, a touch panel 630, an operation key 640, and a short-distance communication processor 607 connected to an antenna 606. The display 620 may be an LCD, an organic electroluminescence display panel, or another display screen technology. In addition to displaying still and moving image data, the display 620 may display operational inputs, such as numbers or icons which may be used for control of the processing device. The display 620 may additionally display a GUI for a user to control aspects of the processing device and/or other devices. Further, the display 620 may display characters and images received by the processing device and/or stored in the memory 650 or accessed from an external device on a network. For example, the processing device may access a network such as the Internet and display text and/or images transmitted from a Web server.

The touch panel 630 may include a physical touch panel display screen and a touch panel driver. The touch panel 630 may include one or more touch sensors for detecting an input operation on an operation surface of the touch panel display screen. The touch panel 630 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 630 may detect when the stylus approaches/contacts the operation surface of the touch panel display (similar to the case in which a finger is used for the touch operation).

In certain aspects of the present disclosure, the touch panel 630 may be disposed adjacent to the display 620 (e.g., laminated) or may be formed integrally with the display 620. For simplicity, the present disclosure assumes the touch panel 630 is formed integrally with the display 620 and therefore, examples discussed herein may describe touch operations being performed on the surface of the display 620 rather than the touch panel 630. However, the skilled artisan will appreciate that this is not limiting.

For simplicity, the present disclosure assumes the touch panel 630 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 630 may include transparent electrode touch sensors arranged in the X-Y direction on the surface of transparent sensor glass.

The touch panel driver may be included in the touch panel 630 for control processing related to the touch panel 630, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in an embodiment, the touch panel 630 may detect a position of a user's finger around an edge of the display panel 620 (e.g., gripping a protective case that surrounds the display/touch panel). Signals may be transmitted by the touch panel driver, e.g. in response to a detection of a touch operation, in response to a query from another element based on timed data exchange, etc.

The touch panel 630 and the display 620 may be surrounded by a protective casing, which may also enclose the other elements included in the processing device. In an embodiment, a position of the user's fingers on the protective casing (but not directly on the surface of the display 620) may be detected by the touch panel 630 sensors. Accordingly, the controller 610 may perform display control processing described herein based on the detected position of the user's fingers gripping the casing. For example, an element in an interface may be moved to a new location within the interface (e.g., closer to one or more of the fingers) based on the detected finger position.

Further, in an embodiment, the controller 610 may be configured to detect which hand is holding the processing device, based on the detected finger position. For example, the touch panel 630 sensors may detect a plurality of fingers on the left side of the processing device (e.g., on an edge of the display 620 or on the protective casing), and detect a single finger on the right side of the processing device. In this exemplary scenario, the controller 610 may determine that the user is holding the processing device with his/her right hand because the detected grip pattern corresponds to an expected pattern when the processing device is held only with the right hand.

The operation key 640 may include one or more buttons or similar external control elements, which may generate an operation signal based on a detected input by the user. In addition to outputs from the touch panel 630, these operation signals may be supplied to the controller 610 for performing related processing and control. In certain aspects of the present disclosure, the processing and/or functions associated with external buttons and the like may be performed by the controller 610 in response to an input operation on the touch panel 630 display screen rather than the external button, key, etc. In this way, external buttons on the processing device may be eliminated in lieu of performing inputs via touch operations, thereby improving watertightness.

The antenna 606 may transmit/receive electromagnetic wave signals to/from other external apparatuses, and the short-distance wireless communication processor 607 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 607.

The processing device may include a motion sensor 608. The motion sensor 608 may detect features of motion (i.e., one or more movements) of the processing device. For example, the motion sensor 608 may include an accelerometer to detect acceleration, a gyroscope to detect angular velocity, a geomagnetic sensor to detect direction, a geolocation sensor to detect location, etc., or a combination thereof to detect motion of the processing device. In an embodiment, the motion sensor 608 may generate a detection signal that includes data representing the detected motion. For example, the motion sensor 608 may determine a number of distinct movements in a motion (e.g., from start of the series of movements to the stop, within a predetermined time interval, etc.), a number of physical shocks on the processing device (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 610, whereby further processing may be performed based on data included in the detection signal. The motion sensor 608 can work in conjunction with a Global Positioning System (GPS) section 660. The information of the present position detected by the GPS section 660 is transmitted to the controller 610. An antenna 661 is connected to the GPS section 660 for receiving and transmitting signals to and from a GPS satellite.

The processing device may include a camera section 609, which includes a lens and shutter for capturing photographs of the surroundings around the processing device. In an embodiment, the camera section 609 captures surroundings of an opposite side of the processing device from the user. The images of the captured photographs can be displayed on the display panel 620. A memory section saves the captured photographs. The memory section may reside within the camera section 609 or it may be part of the memory 650. The camera section 609 can be a separate feature attached to the processing device or it can be a built-in camera feature.

An example of a type of computer is shown in FIG. 25. The computer 700 can be used for the operations described in association with any of the computer-implement methods described previously, according to one implementation. For example, the computer 700 can be an example of a server, such as the one discussed above. The computer 700 includes processing circuitry, as discussed above. The processing circuitry includes one or more of the elements discussed next with reference to FIG. 25. In FIG. 25, the computer 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the computer 700. In one implementation, the memory 720 is a computer-readable medium. In one implementation, the memory 720 is a volatile memory. In another implementation, the memory 720 is a non-volatile memory.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the computer 700. In one implementation, the input/output device 740 includes a keyboard and/or pointing device. In another implementation, the input/output device 740 includes a display for displaying graphical user interfaces.

Embodiments of the subject matter and the functional operations described in this specification can be implemented in digital electronic circuitry, in tangibly embodied computer Software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus' refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, Software, a software application, a module, a software module, a script, or code, can be written in any form of programming language, including compiled or interpreted languages, or declarative or procedural languages, and it can be deployed in any form, including as a stand-alone program or as a module, component, Subroutine, or other unit Suitable for use in a computing environment. A computer program may, but need not, correspond to a file in a file system. A program can be stored in a portion of a file that holds other programs or data, e.g., one or more Scripts stored in a markup language document, in a single file dedicated to the program in question, or in multiple coordinated files, e.g., files that store one or more modules, Sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. Elements of a computer include a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have Such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be Supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Next, a hardware description of a device according to exemplary embodiments is described with reference to FIG. 26. In FIG. 26, the device, which can be the above described processing device or the server, includes processing circuitry, as discussed above. The processing circuitry includes one or more of the elements discussed next with reference to FIG. 26. In FIG. 26, the device/server includes a CPU 800 which performs the processes described above/below. The process data and instructions may be stored in memory 802. These processes and instructions may also be stored on a storage medium disk 804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device communicates, such as a server or computer.

Further, the claimed advancements may be provided as a utility application, background daemon, or component of an operating system, or combination thereof, executing in conjunction with CPU 800 and an operating system such as Microsoft Windows, UNIX, Solaris, LINUX, Apple MAC-OS and other systems known to those skilled in the art.

The hardware elements in order to achieve the device may be realized by various circuitry elements, known to those skilled in the art. For example, CPU 800 may be a Xenon or Core processor from Intel of America or an Opteron processor from AMD of America, or may be other processor types that would be recognized by one of ordinary skill in the art. Alternatively, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the processes described above.

The device in FIG. 26 also includes a network controller 806, such as an Intel Ethernet PRO network interface card from Intel Corporation of America, for interfacing with network 851, and to communicate with a server 850. As can be appreciated, the network 851 can be a public network, such as the Internet, or a private network such as an LAN or WAN network, or any combination thereof and can also include PSTN or ISDN sub-networks. The network 851 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The device further includes a display controller 808, such as a NVIDIA GeForce GTX or Quadro graphics adaptor from NVIDIA Corporation of America for interfacing with display 810, such as an LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners.

A sound controller 820 is also provided in the device to interface with speakers/microphone 822 thereby providing sounds and/or music.

The general-purpose storage controller 824 connects the storage medium disk 804 with communication bus 826, which may be an ISA, EISA, VESA, PCI, or similar, for interconnecting all of the components of the device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

Obviously, numerous modifications and variations are possible in light of the above teachings. It is therefore to be understood that within the scope of the appended claims, the embodiments may be practiced otherwise than as specifically described herein.

Embodiments of the present disclosure may also be as set forth in the following parentheticals.

(1) A method, comprising: locating, via processing circuitry, a label 150 in an image, the label 150 including a QR code, a bar code, and text displayed on the label; locating, via the processing circuitry, the QR code on the label; locating, via the processing circuitry, the bar code on the label; locating, via the processing circuitry, the text on the label; locating, via the processing circuitry, a region of the label 150 including a test strip, the test strip configured to display a result of a drug screening test; locating, via the processing circuitry, the test strip in the region of the label; and detecting, via the processing circuitry, the result displayed by the test strip.

(2) The method of (1), further comprising generating, via the processing circuitry, a determination based on the detected result of the test strip, the determination related to a presence of a chemical in a fluid of a user.

(3) The method of either (1) or (2), further comprising applying, via the processing circuitry, image thresholding to convert pixels of the image into a black or a white color based on whether a pixel value of the pixel is above a predetermined pixel value threshold value.

(4) The method of any one of (1) to (3), wherein the pixel value is an intensity of a red-blue-green value of the pixel.

(5) The method of any one of (1) to (4), further comprising applying, via the processing circuitry, contour detection to locate the QR code, the bar code, the text, and the test strip result.

(6) The method of any one of (1) to (5), wherein the QR code, the bar code, the text, and the test strip are arranged on the label 150 having a fixed arrangement relative to one another.

(7) The method of any one of (1) to (6), wherein the locating, via the processing circuitry, the bar code on the label 150 further comprises determining the location of the QR code and an expected location of the bar code on the label 150 based on the location of the QR code; and searching the expected location of the bar code on the label.

(8) The method of any one of (1) to (7), wherein the locating, via the processing circuitry, the bar code on the label 150 further comprises determining the location of the text and an expected location of the bar code on the label 150 based on the location of the text; and searching the expected location of the bar code on the label.

(9) The method of any one of (1) to (8), wherein the locating, via the processing circuitry, the QR code on the label 150 further comprises determining the location of the bar code and an expected location of the QR code on the label 150 based on the location of the bar code; and searching the expected location of the QR code on the label.

(10) The method of any one of (1) to (9), wherein the locating, via the processing circuitry, the QR code on the label 150 further comprises determining the location of the text and an expected location of the QR code on the label 150 based on the location of the text; and searching the expected location of the QR code on the label.

(11) The method of any one of (1) to (10), wherein the locating, via the processing circuitry, the region of the label 150 including the test strip further comprises determining the location of the QR code and an expected location of the region of the label 150 including the test strip based on the location of the QR code; and searching the expected location of the region of the label 150 including the test strip.

(12) The method of any one of (1) to (11), wherein the locating, via the processing circuitry, the region of the label 150 including the test strip further comprises determining the location of the bar code and an expected location of the region of the label 150 including the test strip based on the location of the bar code; and searching the expected location of the region of the label 150 including the test strip.

(13) A method, comprising: instructing an applicant to perform a drug screen test by obtaining a fluid sample from an applicant; obtaining a drug test result based on the fluid sample; and obtaining, via a first device, an image of the obtained drug test result; detecting, via the first device, the drug test result from the image of the drug test result; generating, via the first device, a first determination based on the detected drug test result; transmitting, via the first device, the image of the drug test result and the determination to a second device; displaying, via the second device, the image of the drug rest result to an administrator; obtaining, via the administrator, a second determination based on the image of the drug test result; upon determining the first determination and the second determination are the same, confirming the drug test result; upon determining the first determination and the second determination are not the same, determining whether the detected drug test result is invalid; upon determining the detected drug test result is invalid, communicating with the first device to instruct the applicant to perform the drug screen test again; upon determining the first determination and the second determination are not the same, determining whether the detected drug test result is inconclusive; and upon determining the detected drug test result is invalid, requesting the administrator adjudicate the detected drug result.

(15) A device, comprising: a base; a mount 2110 attached to the base, the mount 2110 including a backplate 2125, a bottom platform 2115 formed perpendicular to the backplate 2125 along a bottom of the backplate 2125, the bottom platform 2115 including a retention wall formed as part of the bottom platform 2115 distant from the portion of the bottom platform 2115 attached to the backplate 2125, the retention wall being perpendicular to the bottom platform 2115, and a first side arm 2120 formed as part of the backplate 2125 along a side of the backplate 2125 and extending outwards from the backplate 2125, and a notch 2130 holder formed as part of the base, the notch 2130 holder configured to secure a drug test device 100 to the base.

(16) The device of (15), wherein the mount 2110 is configured to secure the processing device at a predetermined angle relative to a plane of the base.

(17) The device of either (15) or (16), wherein the holder is configured to secure the drug test device 100 at a predetermined angle relative to a plane of the base.

(18) The device of any one of (15) to (17), wherein the predetermined angle of the secured drug test is the same as a predetermined angle of the processing device secured to the mount 2110 relative to the plane of the base.

(19) The device of any one of (15) to (18), further comprising a light source 2135 attached to the mount 2110.

(20) The device of any one of (15) to (19), wherein the light source 2135 is integrated into the mount 2110.

(21) The device of any one of (15) to (20), wherein the light source 2135 is integrated into the first side arm 2120.

(22) The device of any one of (15) to (21), wherein the first side arm 2120 includes an angle rotation drum, the light source 2135 being formed as part of the angle rotation drum, the angle rotation drum configured to rotate about an axis of the drum and adjust an angle of the light source 2135.

(23) The device of any one of (15) to (22), wherein the light source 2135 is configured to activate when a camera of the processing device obtains an image of the drug test device 100.

(24) The device of any one of (15) to (23), further comprising a processing device, the mount 2110 configured to receive the processing device in the mount 2110 wherein a first surface of the processing device abuts the backplate 2125, a first edge of the processing device abuts the bottom platform 2115, and a second edge of the processing device abuts the first side arm 2120.

(25) The device of any one of (15) to (24), wherein the processing device includes a camera, the camera being oriented at an angle equal to an angle of the backplate 2125.

(26) The device of any one of (15) to (25), wherein the camera of the processing device is angled at the drug test device 100 secured in the notch holder.

Thus, the foregoing discussion discloses and describes merely exemplary embodiments. As will be understood by those skilled in the art, the present disclosure may be embodied in other specific forms without departing from the spirit or essential characteristics thereof. Accordingly, the disclosure is intended to be illustrative, but not limiting of the scope of thereof, as well as other claims. The disclosure, including any readily discernible variants of the teachings herein, defines, in part, the scope of the foregoing claim terminology such that no inventive subject matter is dedicated to the public.

The invention claimed is:

1. An apparatus, comprising:
a base;
a mount attached to the base, the mount including
a backplate,
a bottom platform formed perpendicular to the backplate along a bottom of the backplate, the bottom platform including a retention wall formed as part of the bottom platform distant from a portion of the bottom platform attached to the backplate, the retention wall being perpendicular to the bottom platform, and
a first side arm formed as part of the backplate along a side of the backplate and extending outwards from the backplate;
a light source attached to the mount; and
a notch holder formed as part of the base, the notch holder configured to secure a container to the base.

2. The apparatus of claim 1, wherein the mount is configured to secure a processing device at a predetermined angle relative to a plane of the base.

3. The apparatus of claim 1, wherein the notch holder is configured to secure the container at a predetermined angle relative to a plane of the base.

4. The apparatus of claim 2, wherein a predetermined angle of the container is a same angle as the predetermined angle of the processing device secured to the mount relative to the plane of the base.

5. The apparatus of claim 1, wherein the light source is integrated into the mount.

6. The apparatus of claim 1, wherein the light source is integrated into the first side arm.

7. The apparatus of claim 6, wherein the first side arm includes an angle rotation drum, the light source being formed as part of the angle rotation drum, the angle rotation drum configured to rotate about an axis of the angle rotation drum and adjust an angle of the light source.

8. The apparatus of claim 1, wherein the light source is configured to activate when a camera of a processing device obtains an image of the container.

9. The apparatus of claim 1, further comprising a processing device, the mount configured to receive the processing device in the mount wherein a first surface of the processing device abuts the backplate, a first edge of the processing device abuts the bottom platform, and a second edge of the processing device abuts the first side arm.

10. The apparatus of claim 9, wherein the processing device includes a camera, the camera being oriented at an angle equal to an angle of the backplate.

11. The apparatus of claim 10, wherein the camera of the processing device is angled at the container secured in the notch holder.

12. An apparatus, comprising:
a base;
a mount attached to the base, the mount including
a backplate,
a bottom platform formed perpendicular to the backplate along a bottom of the backplate, the bottom platform including a retention wall formed as part of the bottom platform distant from a portion of the bottom platform attached to the backplate, the retention wall being perpendicular to the bottom platform, and
a first side arm formed as part of the backplate along a side of the backplate and extending outwards from the backplate; and
a notch holder formed as part of the base, the notch holder configured to secure a container to the base at a predetermined angle, the predetermined angle of the container being a same angle as a predetermined angle of a processing device secured to the mount relative to a plane of the base.

13. The apparatus of claim 12, further comprising a light source attached to the mount.

14. The apparatus of claim 13, wherein the light source is integrated into the mount.

15. The apparatus of claim 13, wherein the light source is integrated into the first side arm.

16. The apparatus of claim 13, wherein the first side arm includes an angle rotation drum, the light source being formed as part of the angle rotation drum, the angle rotation drum configured to rotate about an axis of the angle rotation drum and adjust an angle of the light source.

17. The apparatus of claim 13, wherein the light source is configured to activate when a camera of the processing device obtains an image of the container.

18. The apparatus of claim 12, wherein
the mount is configured to receive the processing device in the mount,
a first surface of the processing device abuts the backplate,
a first edge of the processing device abuts the bottom platform, and
a second edge of the processing device abuts the first side arm.

19. The apparatus of claim 12, wherein the processing device includes a camera, the camera being oriented at an angle equal to an angle of the backplate.

\* \* \* \* \*